United States Patent
Amy et al.

(10) Patent No.: US 10,664,249 B2
(45) Date of Patent: May 26, 2020

(54) VERIFIED COMPILATION OF REVERSIBLE CIRCUITS

(71) Applicant: Microsoft Technology Licensing, LLC, Redmond, WA (US)

(72) Inventors: Matthew Amy, Toronto (CA); Martin Roetteler, Woodinville, WA (US); Krysta Svore, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 682 days.

(21) Appl. No.: 15/060,408

(22) Filed: Mar. 3, 2016

(65) Prior Publication Data

US 2017/0147303 A1 May 25, 2017

Related U.S. Application Data

(60) Provisional application No. 62/258,133, filed on Nov. 20, 2015.

(51) Int. Cl.
*G06F 17/50* (2006.01)
*G06F 8/41* (2018.01)
*G06N 10/00* (2019.01)

(52) U.S. Cl.
CPC ............... *G06F 8/44* (2013.01); *G06F 8/436* (2013.01); *G06N 10/00* (2019.01)

(58) Field of Classification Search
CPC ............ G06F 17/5045; G06F 17/5022; G06F 17/5027; G06F 17/5072; G06F 2217/86;
(Continued)

(56) References Cited

U.S. PATENT DOCUMENTS 6,578,018 B1   6/2003  Ulyanov
7,219,017 B2   5/2007  Vitaliano et al.
(Continued)

FOREIGN PATENT DOCUMENTS

CN      101923457      12/2010
WO   WO 2009/109041     9/2009
(Continued)

OTHER PUBLICATIONS

Abhari et al., "Scaffold: Quantum Programming Language," Princeton University, Technical Report 934-12, 43 pp. (Jul. 2012).
(Continued)

*Primary Examiner* — Binh C Tat
(74) *Attorney, Agent, or Firm* — Holzer Patel Drennan

(57) ABSTRACT

The generation of reversible circuits from high-level code is desirable in a variety of application domains, including low-power electronics and quantum computing. However, little effort has been spent on verifying the correctness of the results, an issue of particular importance in quantum computing where such circuits are run on all inputs simultaneously. Disclosed herein are example reversible circuit compilers as well as tools and techniques for verifying the compilers. Example compilers disclosed herein compile a high-level language into combinational reversible circuits having a reduced number of ancillary bits (ancilla bits) and further having provably clean temporary values.

13 Claims, 14 Drawing Sheets

(58) Field of Classification Search
CPC ............. G06F 15/17381; G06F 17/505; G06F 17/5068; G06F 2213/0016; G06F 2217/68; G06F 8/40; G06F 8/4452; G06F 8/452; G06F 9/52; G06F 13/4291; G06F 2217/84; G06F 13/385; G06F 13/4022; G06F 13/4282; G06F 15/7864; G06F 17/5031; G06F 17/504; G06F 17/5063; G06F 1/04; G06F 2207/3852; G06F 2217/66; G06F 7/5318; G06F 9/453; G06F 17/211; G06F 17/2241; G06F 17/5009; G06F 17/5077; G06F 17/509; G06F 21/14; G06F 21/75; G06F 21/79; G06F 2217/06; G06F 2217/78; G06F 7/588; G06F 8/436; G06F 8/44; G06F 13/22; H01L 27/0207; H01L 27/11807; G11C 11/40; G11C 27/005; G11C 7/10; H03K 19/0944; H03K 5/135; H03K 19/17736; H03K 19/00
USPC ................................................ 716/106–115
See application file for complete search history.

(56) References Cited

U.S. PATENT DOCUMENTS

| | | | |
|---|---|---|---|
| 7,427,876 | B1 | 9/2008 | Wang et al. |
| 8,190,553 | B2 | 5/2012 | Routt |
| 8,244,650 | B2 | 8/2012 | Rose |
| 9,881,256 | B2 | 1/2018 | Hamze et al. |
| 10,320,360 | B2 | 6/2019 | Wiebe et al. |
| 2001/0044912 | A1 | 11/2001 | Francis et al. |
| 2003/0093451 | A1 | 5/2003 | Chuang et al. |
| 2003/0121028 | A1 | 6/2003 | Coury et al. |
| 2004/0025122 | A1* | 2/2004 | Schubert ............. G06F 17/5022 716/106 |
| 2004/0078421 | A1 | 4/2004 | Routt |
| 2004/0246028 | A1 | 12/2004 | Lee et al. |
| 2007/0162262 | A1 | 7/2007 | Tucci |
| 2007/0266347 | A1* | 11/2007 | Chang .................... G06N 10/00 716/103 |
| 2008/0028347 | A1* | 1/2008 | Hiraoglu ............... G06F 17/504 716/103 |
| 2008/0082946 | A1* | 4/2008 | Zilic ..................... G06F 17/504 716/103 |
| 2008/0147049 | A1 | 6/2008 | Amato et al. |
| 2008/0238480 | A1* | 10/2008 | Wang .................... H03K 3/037 326/46 |
| 2009/0228849 | A1* | 9/2009 | Mossawir ............. G06F 17/504 716/106 |
| 2010/0287374 | A1 | 11/2010 | Roy et al. |
| 2011/0113392 | A1* | 5/2011 | Chakraborty ......... G06F 17/505 716/102 |
| 2013/0246495 | A1 | 9/2013 | Svore et al. |
| 2014/0245249 | A1 | 8/2014 | Macready et al. |
| 2016/0328253 | A1 | 11/2016 | Majumdar |
| 2018/0181685 | A1 | 6/2018 | Roetteler et al. |

FOREIGN PATENT DOCUMENTS

| | | |
|---|---|---|
| WO | WO 2015-060915 | 4/2015 |
| WO | WO 2015/123083 | 8/2015 |

OTHER PUBLICATIONS

Aho et al., Compilers—Principles, Techniques, and tools, 804 pp. (Sep. 2006).
Altenkirch et al., "The Quantum IO Monad," Proc. of Semantic Techniques in Quantum Computation, 40 pp. (Jan. 2013).
Amy et al., "Verified compilation of space-efficient reversible circuits," downloaded from arxiv.org, 24 pp. (Mar. 2016).
Beckman et al., "Efficient networks for quantum factoring," Physical Review A, vol. 54, No. 2, pp. 1034-1063 (Aug. 1996).
Bennett, "Logical Reversibility of Computation," IBM J. Res. Develop., pp. 525-532 (Nov. 1973).
Bennett, "Time/Space Trade-Offs for Reversible Computation," SIAM Journal on Computing, vol. 18, Issue 4, pp. 766-776 (Aug. 1989).
"Berkeley Logic Interchange Format (BLIF)," University of California Berkeley, 11 pp. (Jul. 1992).
Berry et al., "Exponential improvement in precision for simulating sparse Hamiltonians," Proc. ACM Symp. on Theory of Computing, pp. 283-292 (May 2014).
Buhrman et al., "Time and Space Bounds for Reversible Simulation," Int'l Colloquium, Automata, Languages and Programming, 11 pp. (Jul. 2001).
Carøe, "Design of Reversible Computing Systems," Ph.D. thesis, University of Copenhagen, 54 pp. (Jul. 2012).
Chan, "Pebble Games and Complexity," University of California at Berkeley, Electrical Engineering and Computer Sciences, Technical Report No. UCB/EECS-2013-145, 76 pp. (Aug. 2013).
Cuccaro et al., "A new quantum ripple-carry addition circuit," Journal of Quantum Physics, 9 pp. (Oct. 2004).
Draper et al., "A Logarithmic-Depth Quantum Carry-Lookahead Adder," Journal of Quantum Information & Computation, vol. 6, Issue 4, 21 pp. (Jul. 2006).
Federal Information Processing Standards Publication 180-2, "Announcing the Secure Hash Standard," 76 pp. (Aug. 2002).
Frank et al., "Relativized Separation of Reversible and Irreversible Space-Time Complexity Classes," Proc. of Information and Computation, 39 pp. (May 2001).
Goldschmidt et al., "Approximation Algorithms for the k-Clique Covering Problem," SIAM Journal on Discrete Mathematics, vol. 9, Issue 3, 24 pp. (Aug. 1995).
Golubitsky et al., "A Study of Optimal 4-Bit Reversible Toffoli Circuits and Their Synthesis," IEEE Trans. on Computers, vol. 61, No. 9, pp. 1341-1353 (Sep. 2012).
Green et al., "An Introduction to Quantum Programming in Quipper," Proc. Int'l Conf. on Reversible Computation, 15 pp. (Jul. 2013).
Green et al., "Quipper: A Scalable Quantum Programming Language," Proc. ACM SIGPLAN Conf. on Programming Language Design and Implementation, pp. 333-342 (Jun. 2013).
Green, "Towards a formally verified functional quantum programming language," Ph.D. Thesis, University of Nottingham, 237 pp. (Jul. 2010).
Grover, "A fast quantum mechanical algorithm for database search," Proc. of ACM Symp. on Theory of Computing, pp. 212-219 (May 1996).
Heckey et al., "Compiler Management of Communication and Parallelism for Quantum Computation," Int'l Conf. on Architectural Support for Programming Languages and Operating Systems, pp. 445-456 (Mar. 2015).
Hennessy et al., Computer Architecture—A Quantitative Approach, Fifth Edition, 848 pp. (Apr. 1990).
International Search Report and Written Opinion dated Feb. 16, 2017, for International Patent Application No. PCT/US2016/061945, 13 pp.
JavadiAbhari et al., "ScaffCC: A Framework for Compilation and Analysis of Quantum Computing Programs," Proc. of ACM Int'l Conf. on Computing Frontiers, 10 pp. (May 2014).
Knill, "An Analysis of Bennett's Pebble Game," Los Alamos National Laboratory Report LAUR-95-2258, 15 pp. (May 1995).
Kowada et al., "Reversible Karatsuba's Algorithm," Journal of Universal Computer Science, vol. 12, No. 5, pp. 499-511 (Jun. 2006).
Lange et al., "Reversible Space Equals Deterministic Space," Journal of Computer and System Sciences, vol. 60, pp. 354-367 (Apr. 2000).
Lapets et al., "Abstract Resource Cost Derivation for Logical Quantum Circuit Descriptions," Workshop on Functional Programming Concepts in Domain-Specific Languages, pp. 35-42 (Sep. 2013).

(56) References Cited

OTHER PUBLICATIONS

Lapets et al., "QuaFL: A Typed DSL for Quantum Programming," *Workshop on Functional Programming Concepts in Domain-Specific Languages*, pp. 19-26 (Sep. 2013).
Levine et al., "A Note on Bennett's Space-Time Tradeoff for Reversible Computation," *Siam J. Comput.*, vol. 19, No. 4, pp. 673-677 (Aug. 1990).
Lewandowski et al., "A Method for the Design and Verification of Reversible Logic Structures," University of South Florida College of Engineering Research Day, 1 p. (2011).
Lin et al., "RMDDS: Reed-Muller Decision Diagram Synthesis of Reversible Logic Circuits," *ACM Journal on Emerging Technologise in Computing Systems*, vol. 10, No. 2, 25 pp. (Feb. 2014).
Markov et al., "Limits on Fundamental Limits to Computation," *Proc of Nature*, vol. 512, Issue 7513, 15 pp. (Aug. 2014).
Maslov et al., "Reversible Circuit Optimization via Leaving the Boolean Domain," *IEEE Trans. on Computer-Aided Design of Integrated Circuits and Systems*, vol. 30, No. 6, pp. 806-816 (Jun. 2011).
Maslov et al., "Techniques for the Synthesis of Reversible Toffoli Networks," *ACM Trans. on Design Automation of Electronic Systems*, vol. 12, No. 4, 28 pp. (Sep. 2007).
Maslov et al., "Toffoli Network Synthesis With Templates," *IEEE Trans. on Computer-Aided Design of Integrated Circuits and Systems*, vol. 24, No. 6, pp. 807-817 (Jun. 2005).
Menezes et al., *Handbook of Applied Cryptography*, CRC Press, 794 pp. (Oct. 1996).
Miller et al., "A Transformation Based Algorithm for Reversible Logic Synthesis," *Design Automation Conf.*, pp. 318-323 (Jun. 2003).
Mishchenko et al., "Boolean Factoring and Decomposition of Logic Networks," *IEEE/ACM Int'l Conf. on Computer-Aided Design*, 7 pp. (Nov. 2008).
Mohnke, "A Signature-Based Approach to Formal Logic Verification," Ph.D. Thesis, 88 pp. (Feb. 1999).
Omer, "Quantum Programming in QCL," Master's Thesis, Technical University of Vienna, 109 pp. (Jan. 2000).
Parent et al., "Reversible circuit compilation with space constraints," 32 pp. (Oct. 2015).
Saeedi et al., "Synthesis and Optimization of Reversible Circuits—A Survey," *ACM Computing Surveys*, vol. 45, No. 2, 34 pp. (Feb. 2012).
Shafaei et al., "Reversible Logic Synthesis of k-Input, m-Output Lookup Tables," *Conf. on Design, Automation and Test in Europe*, 6 pp. (Mar. 2013).
Shor, "Polynomial-Time Algorithms for Prime Factorization and Discrete Logarithms on a Quantum Computer," *Journal of SIAM Journal on Computing*, vol. 26, Issue 5, 28 pp. (Oct. 1997).
Selinger et al., "Quantum Lambda Calculus," *Proc. of Semantic Techniques in Quantum Computation*, 46 pp. (2010).
Svore et al., "Toward a Software Architecture for Quantum Computing Design Tools," *Proc. Int'l Workshop on Quantum Programming Languages*, 20 pp. (Jul. 2004).
Thomsen, "A Functional Language for Describing Reversible Logic," *Proc. of Forum on Specification and Design Languages*, 8 pp. (Sep. 2012).
Valiron et al., "Programming the Quantum Future," *Comm. of the ACM*, vol. 58, No. 8, pp. 52-61 (Aug. 2015).
Wecker et al., "LIQUi|>: A Software Design Architecture and Domain-Specific Language for Quantum Computing," *Proc. Computing Research Repository*, 14 pp. (Feb. 2014).
Wille, "An Introduction to Reversible Circuit Design," *Saudi Int'l Electronics, Communications and Photonics Conf.*, 4 pp. (Apr. 2011).
Yang, "Logic Synthesis and Optimization Benchmarks User Guide, Version 3.0," Technical Report, 44 pp. (Jan. 1991).
Yokoyama et al., "A Reversible Programming Language and its Invertible Self-Interpreter," *ACM SIGPLAN Symp. on Partial Evaluation and Semantics-based Program Manipulation*, pp. 144-153 (Jan. 2007).
Yokoyama et al., "Principles of a Reversible Programming Language," *Conf. on Computing Frontiers*, pp. 43-54 (May 2008).
Abdollahi et al., "Reversible Logic Synthesis by Quantum Rotation Gates," *Quantum Information and Computation*, vol. 13, 22 pp. (Sep. 2013).
Bahi, "High Performance by Exploiting Information Locality Through Reverse Computing," Thesis, Université Paris-SUD, 129 pp. (Dec. 2011).
Bahi et al., "High Performance by Exploiting Information Locality Through Reverse Computing," *Int'l Symp. on Computer Architecture and High Performance Computing*, pp. 25-32 (Oct. 2011).
Golumbic et al., "Factoring Logic Functions Using Graph Partitioning," *IEEE/ACM Int'l Conf. on Computer-Aided Design*, 4 pp. (Nov. 1999).
Guan et al., "Reversible Synthesis with Minimum logic function," *Int'l Conf. on Computational Intelligence and Security*, vol. 2, pp. 968-971 (Nov. 2006).
Gupta et al., "An Algorithm for Synthesis of Reversible Logic Circuits," *IEEE Trans. on Computer-Aided Design of Integrated Circuits and Systems*, vol. 25, No. 11, pp. 2317-2330 (Nov. 2006).
International Preliminary Report on Patentability dated Feb. 1, 2018, from International Patent Application No. PCT/US2016/061945, 8 pp.
Kole et al., "Optimal Reversible Logic Circuit Synthesis based on a Hybrid DFS-BFS Technique," *Int'l Symp. on Electronic System Design*, pp. 208-212 (Dec. 2010).
Nielsen et al., "Quantum Computation and Quantum Information," 698 pp. (Oct. 2000).
Perumalla, "Introduction to Reversible Computing," *High Performance Computing & Simulation International Conference*, 3 pp. (Jul. 2014).
Selinger et al., "Quantum Lambda Calculus," Cambridge University Press, 46 pp. (May 2015).
Syme et al., *Expert F#*, Chapter 3, "Introducing Functional Programming," pp. 27-68 (Oct. 2012).
Wikipedia, "MD5," 11 pp. (May 2015).
Wikipedia, "SHA-2," 13 pp. (May 2015).
Written Opinion of the International Preliminary Examining Authority dated Oct. 26, 2017, from International Patent Application No. PCT/US2016/061945, 7 pp.
International Search Report and Written Opinion dated Sep. 6, 2016, from International Patent Application No. PCT/US2016/036110, 14 pp.
"Office Action Issued in European Patent Application No. 16732070.4", dated Sep. 12, 2019, 7 Pages.
"Non Final Office Action Issued in U.S. Appl. No. 15/735,102", dated Nov. 29, 2019, 6 Pages.

\* cited by examiner

400

```
let ch e f g =
  let t = Array.zeroCreate 32
  for i in 0 .. 31 do
    t.[i] <- e.[i] && f.[i] && g.[i]
  t
let ma a b c =
  let t = Array.zeroCreate 32
  for i in 0 .. 31 do
    t.[i] <- (a.[i] && (b.[i] <> c.[i]))
          <> (b.[i] && c.[i])
  t
let s0 a =
  let a2 = rot 2 a
  let a13 = rot 13 a
  let a22 = rot 22 a
  let t = Array.zeroCreate 32
  for i in 0 .. 31 do
    t.[i] <- a2.[i] <> a13.[i] <> a22.[i]
  t
let s1 a =
  let a6 = rot 6 a
  let a11 = rot 11 a
  let a25 = rot 25 a
  let mutable t = Array.zeroCreate 32
  for i in 0 .. 31 do
    t.[i] <- a6.[i] <> a11.[i] <> a25.[i]
  t
fun k w x ->
  let hash x =
    let a = x.[0..31], b = x.[32..63], c = x.[64..95],
        d = x.[96..127], e = x.[128..159], f = x.[160..191],
        g = x.[192..223], h = x.[224..255]
    (%modAdd 32) (ch e f g) h
    (%modAdd 32) (s0 a) h
    (%modAdd 32) w h
    (%modAdd 32) k h
    (%modAdd 32) h d
    (%modAdd 32) (ma a b c) h
    (%modAdd 32) (s1 e) h
  for i in 0 .. n - 1 do
    hash (rot 32*i x)
  x
```

Figure 4

Store $\sigma : \mathbb{N} \rightharpoonup \mathbb{B}$

Config $c ::= \langle t, \sigma \rangle$ $$[\text{REFL}] \frac{}{\langle v, \sigma \rangle \Rightarrow \langle v, \sigma \rangle}$$

$$[\text{LET}] \frac{\langle t_1, \sigma \rangle \Rightarrow \langle v_1, \sigma' \rangle \quad \langle t_2[x \mapsto v_1], \sigma' \rangle \Rightarrow \langle v_2, \sigma'' \rangle}{\langle \text{let } x = t_1 \text{ in } t_2, \sigma \rangle \Rightarrow \langle v_2, \sigma'' \rangle} \quad [\text{APP}] \frac{\langle t_1, \sigma \rangle \Rightarrow \langle \lambda x. t_1', \sigma' \rangle \quad \langle t_2, \sigma' \rangle \Rightarrow \langle v_2, \sigma'' \rangle \quad \langle t_1'[x \mapsto v_2], \sigma'' \rangle \Rightarrow \langle v, \sigma''' \rangle}{\langle (t_1 \, t_2), \sigma \rangle \Rightarrow \langle v, \sigma''' \rangle}$$

$$[\text{SEQ}] \frac{\langle t_1, \sigma \rangle \Rightarrow \langle \text{unit}, \sigma' \rangle \quad \langle t_2, \sigma' \rangle \Rightarrow \langle v, \sigma'' \rangle}{\langle t_1; t_2, \sigma \rangle \Rightarrow \langle v, \sigma'' \rangle} \quad [\text{ASSN}] \frac{\langle t_1, \sigma \rangle \Rightarrow \langle l_1, \sigma' \rangle \quad \langle t_2, \sigma' \rangle \Rightarrow \langle l_2, \sigma'' \rangle}{\langle t_1 \leftarrow t_2, \sigma \rangle \Rightarrow \langle \text{unit}, \sigma''[l_1 \mapsto \sigma''(l_2)] \rangle}$$

$$[\text{B-EXP}] \frac{\langle t_1, \sigma \rangle \Rightarrow \langle l_1, \sigma' \rangle \quad \langle t_2, \sigma' \rangle \Rightarrow \langle l_2, \sigma'' \rangle \quad l_3 \notin \text{dom}(\sigma'')}{\langle t_1 * t_2, \sigma \rangle \Rightarrow \langle l_3, \sigma''[l_3 \mapsto \sigma''(l_1) * \sigma''(l_2)] \rangle} \quad [\text{B-TRUE}] \frac{l \notin \text{dom}(\sigma)}{\langle \text{true}, \sigma \rangle \Rightarrow \langle l, \sigma''[l \mapsto 1] \rangle} \quad [\text{B-FALSE}] \frac{l \notin \text{dom}(\sigma)}{\langle \text{false}, \sigma \rangle \Rightarrow \langle l, \sigma''[l \mapsto 0] \rangle}$$

$$[\text{APPEND}] \frac{\langle t_1, \sigma \rangle \Rightarrow \langle \text{register } l_1 \ldots l_m, \sigma' \rangle \quad \langle t_2, \sigma' \rangle \Rightarrow \langle \text{register } l_{m+1} \ldots l_n, \sigma'' \rangle}{\langle \text{append } t_1 \, t_2, \sigma \rangle \Rightarrow \langle \text{register } l_1 \ldots l_n, \sigma'' \rangle} \quad [\text{INDEX}] \frac{\langle t, \sigma \rangle \Rightarrow \langle \text{register } l_1 \ldots l_n, \sigma' \rangle \quad 1 \le i \le n}{\langle t[i], \sigma \rangle \Rightarrow \langle l_i, \sigma' \rangle}$$

$$[\text{REG}] \frac{\langle t_1, \sigma \rangle \Rightarrow \langle l_1, \sigma_1 \rangle \quad \langle t_2, \sigma_1 \rangle \Rightarrow \langle l_2, \sigma_2 \rangle \quad \cdots \quad \langle t_n, \sigma \rangle \Rightarrow \langle l_n, \sigma_n \rangle}{\langle \text{register } t_1 \ldots t_n, \sigma \rangle \Rightarrow \langle \text{register } l_1 \ldots l_n, \sigma_n \rangle} \quad [\text{SLICE}] \frac{\langle t, \sigma \rangle \Rightarrow \langle \text{register } l_1 \ldots l_n, \sigma' \rangle \quad 1 \le i \le j \le n}{\langle t[i..j], \sigma \rangle \Rightarrow \langle \text{register } l_i \ldots l_j, \sigma' \rangle}$$

$$[\text{ROTATE}] \frac{\langle t, \sigma \rangle \Rightarrow \langle l, \sigma' \rangle}{\langle \text{rotate } t \, i, \sigma \rangle \Rightarrow \langle \text{register } l_i \ldots l_{i-1}, \sigma' \rangle} \quad [\text{ASSERT}] \frac{\langle t, \sigma \rangle \Rightarrow \langle l, \sigma' \rangle \quad \sigma'(l) = \text{true}}{\langle \text{assert } t, \sigma \rangle \Rightarrow \langle \text{unit}, \sigma' \rangle}$$

$$[\text{CLEAN}] \frac{\langle t, \sigma \rangle \Rightarrow \langle l, \sigma' \rangle \quad \sigma'(l) = \text{false}}{\langle \text{clean } t, \sigma \rangle \Rightarrow \langle \text{unit}, \sigma'|_{\text{dom}(\sigma') \setminus \{l\}} \rangle}$$

VERIFIED COMPILATION OF REVERSIBLE CIRCUITS

CROSS-REFERENCE TO RELATED APPLICATIONS

This application claims the benefit of U.S. Provisional Application No. 62/258,133, filed Nov. 20, 2015, and entitled "VERIFIED COMPILATION OF REVERSIBLE CIRCUITS", which is hereby incorporated herein in its entirety.

FIELD

This application relates to reversible computing, such as quantum computing. In particular, this application discloses embodiments for performing compilation of higher-level programs into lower-level reversible circuits and verifying that the compilation occurs in the intended manner.

SUMMARY

Disclosed herein are innovations in compilers of reversible circuit designs, compilers of quantum computing designs, and verification tools for verifying that such compilers operate in their intended manner. The innovations can be implemented as part of a method, as part of a computing device or compilation system configured or programmed to perform any embodiment of the disclosed compilation/synthesis techniques, or as part of a tangible computer-readable media storing computer-executable instructions for causing a computing device to perform any embodiment of the disclosed compilation/synthesis techniques. The innovations can be implemented as part of a method or system for actually implementing quantum operations in a physical implementation of a quantum computer. The various innovations can be used in combination or separately.

One aspect of many quantum algorithms is the use of reversible computations. These are computations whose action on the quantum computer's state space can be described entirely by means of classical states but also have to have the feature that the entire computation can be reversed. Compilers that produce reversible circuits can translate conventional, irreversible programs that are described using a programming language such as F # into reversible circuits, such as the ones generated by Toffoli, CNOT, and NOT gates. Similar to the case of classical logic generation (e.g., for FPGAs or ASICs), one of the basic issues of reversible circuit generation is to ascertain that the generated output of the compilation actually is correct. In the case of reversible computing, and in accordance with certain example embodiments of the disclosed technology, correctness of the circuit means that it implements the target function correctly on all inputs and that it returns all memory that is temporarily allocated upon executing the circuit (so-called ancilla bits) to a clean (or zero) state. Without such verification, a given reversible circuit compiler may produce reversible circuit description that, when implemented in a target reversible circuit architecture, produce the wrong result and/or do not clean up all ancilla bits. This may then corrupt the results from such ancillas when they are re-used during a subsequent computation. Also, such ancilla bits that have been left in an unclean state may lead to entanglement between the computational space and the ancilla space, leading to disappearance of desired interference and ultimately to the failure of a quantum computation.

To address these issues, embodiments of the disclosed technology concern verification tools and techniques for reversible circuits. In particular example implementations, the disclosed verification technology is able to: (a) guarantee that any reversible circuit that is generated by the compiler (e.g. the ReVer compiler) meets the specification that is given by the original, irreversible program; (b) guarantees that the output circuit is a reversible Toffoli network; and/or (c) guarantees that all memory that is temporarily allocated upon executing the resulting Toffoli network (so-called ancilla bits) is returned clean (back to the zero state). In particular implementations, the compiler is verified by a formal proof that has been checked by a formal proof system.

Embodiments of the disclosed technology are described in connection with a compiler referred to herein as ReVer, though the techniques and principles underlying the technology comprise a verification framework that can be adapted for other reversible circuit compilation tools. The ReVer compiler takes a high-level description of a classical function, as specified by an irreversible program in the source language F #, and translates it into a reversible Toffoli network. The ReVer compiler builds on the so-called REVS compiler, which also is a compiler that can take classical functions and turn them into Toffoli networks. However, with the ReVer compiler, a proof of correctness that asserts that the output of ReVer is correct has been implemented and used to formally verify its operation.

In accordance with embodiments of the disclosed technology, verification is performed by considering transformations (e.g., all transformations) that the compiler (e.g., the ReVer compiler) goes through when rewriting the various internal representations (IRs) starting from the high-level program until eventually arriving at the final output, namely the computed Toffoli network. To formalize these transformations, the input and output domains of each level of IR were casted by an abstract syntax and the various rules that describe the effect of executing the basic programming language constructs were described by means of an operational semantics. The semantics include a type system and a set of constraint typing rules as can be used in formal software verification.

Example domain-specific features of the disclosed approach include formal proofs of correctness of two cleanup strategies that the ReVer compiler can implement: the Bennett strategy of compute-copy-uncompute and a space-efficient strategy similar to that of the REVS compiler. The formal proofs of correctness are given in the language F* (which builds on F #). F* allows one to express precise specifications of programs and supports an infrastructure to prove the correctness of programs using computer-assisted proofs.

To test embodiments of the disclosed verification approach, the ReVer compiler was applied to problems at scale (problems that arise when dealing with real world computational problems). These include the computation of arithmetic functions such as the addition of n-bit integers and the computation of hash functions such as SHA-2.

Any of the example compilation and/or verification procedures can be performed by a system comprising a processor and memory and/or by a reversible circuit compiler/verification tool adapted for use in a reversible circuit design and implementation process and implemented by one or more computing devices. Further, any of these example compilation and/or verification procedures can be implemented as computer-executable instructions stored on a computer-readable media, which when executed by a computer cause the computer to perform the procedure.

Embodiments of the disclosed technology include a computer-implemented verification tool configured to perform formal verification of a reversible circuit compiler, the compiler being configured to generate a reversible circuit from a high-level program description of the reversible circuit. The high-level program can be, for example, an algorithmic description of the reversible circuit describing the behavior of the reversible circuit. The reversible circuit generated by the compiler can comprise a reversible gate set, and can be used to implement the gate set in a target quantum circuit architecture.

In example embodiments, the reversible gate set can comprise the set of Toffoli gates, CNOT gates, and NOT gates, where CNOT is specified as $(x, y, z) \mapsto (x, y, z \oplus x \wedge y)$ and CNOT is specified as $(x, y) \mapsto (x, x \oplus y)$, and NOT is specified as $x \mapsto x \oplus 1$. This reversible gate set is referred to herein as a "Toffoli network". In other example embodiments, the reversible gate set can comprise the set of Fredkin gates which map $(0, y, z) \mapsto (0, y, z)$ and $(1, y, z) \mapsto (1, z, y)$, together with the CNOT gate and NOT gate as above.

In example implementations of the verification tool, the verification performed by the verification tool includes verifying that an intermediate representation of the reversible circuit that is generated by the reversible circuit compiler satisfies one or more verification criteria relative to a higher-level intermediate representation of the reversible circuit that is also generated by the reversible circuit compiler. For example, the one or more criteria can include: (a) ensuring that the intermediate representation of the reversible circuit implements the same function as the higher-level intermediate representation; and/or (b) ensuring that all ancilla bits that are allocated by the intermediate representation of the reversible circuit are returned clean. In some implementations, the verifying further includes type-checking the intermediate representation relative to the higher-level intermediate representation. In some implementations, the verifying further comprises performing one or more semantic checks of the intermediate representation relative to the higher-level intermediate representation. The semantic checks can be performed by a proof system that asserts the correctness of one or more transformations of the compiler as the compiler generates the reversible circuit from the high-level program. The verification tool can be implemented in a verification system comprising a processor, and at least one memory coupled to the processor and having stored thereon processor-executable instructions which when executed by the processor cause the processor to perform any of the disclosed verification methods.

Embodiments of the disclosed technology also include a computer-implemented reversible circuit compiler for generating reversible circuits from high-level program descriptions, the compiler having been verified at all levels of internal intermediate representations. Such a compiler can be used to generate reversible circuits from high-level program descriptions.

The foregoing and other objects, features, and advantages of the invention will become more apparent from the following detailed description, which proceeds with reference to the accompanying figures.

BRIEF DESCRIPTION OF THE DRAWINGS

FIG. 4 is a diagram illustrating example code for an implementation of the SHA-2 algorithm with n rounds, using a meta-function modAdd.

FIG. 5 is a diagram illustrating example semantics of REVS.

FIG. 6 is a diagram summarizing algorithmic rules of an example type system.

DETAILED DESCRIPTION

1. General Considerations

Figure 1:
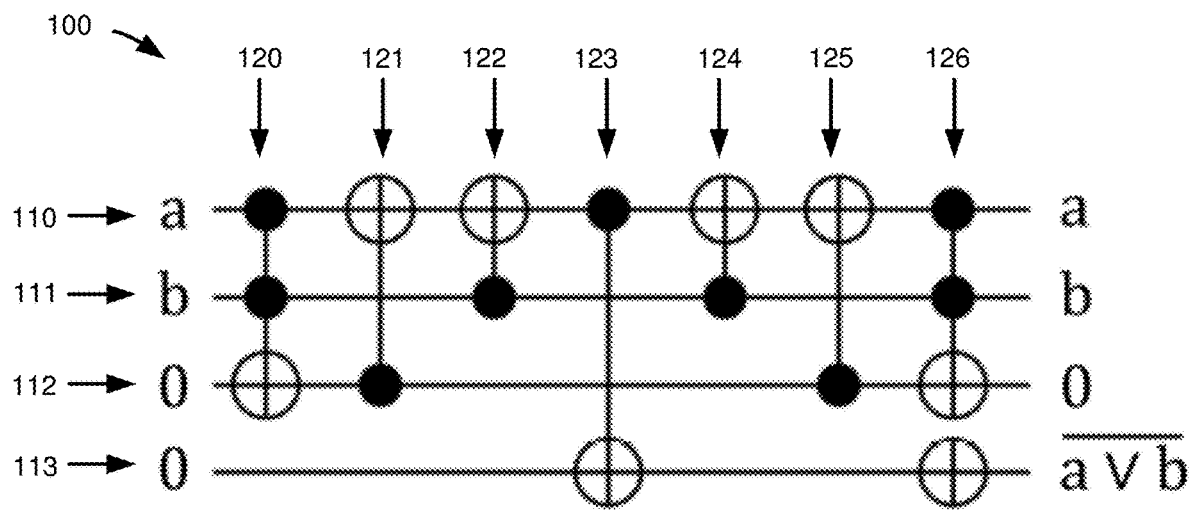
FIG. 1 is a schematic block diagram showing an example reversible circuit over NOT, CNOT, and Toffoli gates computing the NOR function.

Disclosed below are representative embodiments of methods, apparatus, and systems for generating and using lower-level reversible circuit descriptions from higher-level descriptions and verifying that the lower-level reversible circuit descriptions achieve the desired operation. Particular embodiments concern quantum computers and involve systems for generating and using lower-level quantum computer circuit descriptions transformed from higher-level descriptions and verifying such lower-level quantum computer circuit descriptions. For example, the discussion below often refers to example quantum computer embodiments and makes reference to quantum-computer-specific terms, such as qubits. Such usage is for illustrative purposes and is not to be construed as limiting. Instead, it should be understood that the disclosed technology is not limited to quantum computing architectures but is more generally applicable to other reversible circuits and reversible circuit compilation/synthesis tools. For instance, the features described in the particular examples below are applicable to reversible circuits and reversible circuit compilation/synthesis and verification tools generally.

Any of the disclosed example compilation or verification procedures can be performed by a reversible circuit compilation/synthesis system (or verification tool therefor) comprising a processor and memory and/or by a reversible circuit compilation/synthesis tool (or verification tool therefor) adapted for use in a reversible circuit design and implementation process and implemented by one or more computing devices. Further, any of these example synthesis procedures can be implemented as computer-executable instructions stored on a computer-readable media, which when executed by a computer cause the computer to perform the synthesis procedure.

The disclosed methods, apparatus, and systems should not be construed as limiting in any way. Instead, the present disclosure is directed toward all novel and nonobvious features and aspects of the various disclosed embodiments, alone or in various combinations and subcombinations with one another. Furthermore, any features or aspects of the disclosed embodiments can be used in various combinations and subcombinations with one another. For example, one or more method acts or features from one embodiment can be used with one or more method acts or features from another embodiment and vice versa. The disclosed methods, apparatus, and systems are not limited to any specific aspect or feature or combination thereof, nor do the disclosed embodiments require that any one or more specific advantages be present or problems be solved.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Further, some of the methods described herein can be altered by changing the ordering of the method acts described, by splitting, repeating, or omitting certain method acts, etc. Moreover, for the sake of simplicity, the attached figures may not show the various ways in which the disclosed methods can be used in conjunction with other methods. Additionally, the description sometimes uses terms like evaluate to describe the disclosed technology. Such terms are high-level abstractions of the actual operations that are performed. The actual operations that correspond to these terms may vary depending on the particular implementation and are readily discernible by one of ordinary skill in the art.

As used in this application and in the claims, the singular forms a, an, and the include the plural forms unless the context clearly dictates otherwise. Additionally, the term includes means comprises. Further, as used herein, the term and/or means any one item or combination of any items in the phrase. Still further, as used herein, the term optimiz* (including variations such as optimization and optimizing) refers to a choice among options under a given scope of decision, and does not imply that an optimized choice is the best or optimum choice for an expanded scope of decisions.

2. Introduction and Overview

The ability to evaluate classical functions coherently and in superposition as part of a larger quantum computation is useful for many quantum algorithms. This includes Shor's quantum algorithm, as it uses classical modular arithmetic, and Grover's quantum algorithm, as it uses classical predicates to implicitly define the underlying search problem. This creates a desire for tools to help a programmer translate classical, irreversible programs into a form which a quantum computer can understand and carry out, namely into reversible circuits which are a special case of quantum transformations. Other applications of reversible computing include low-power design of classical circuits.

Figure 16:
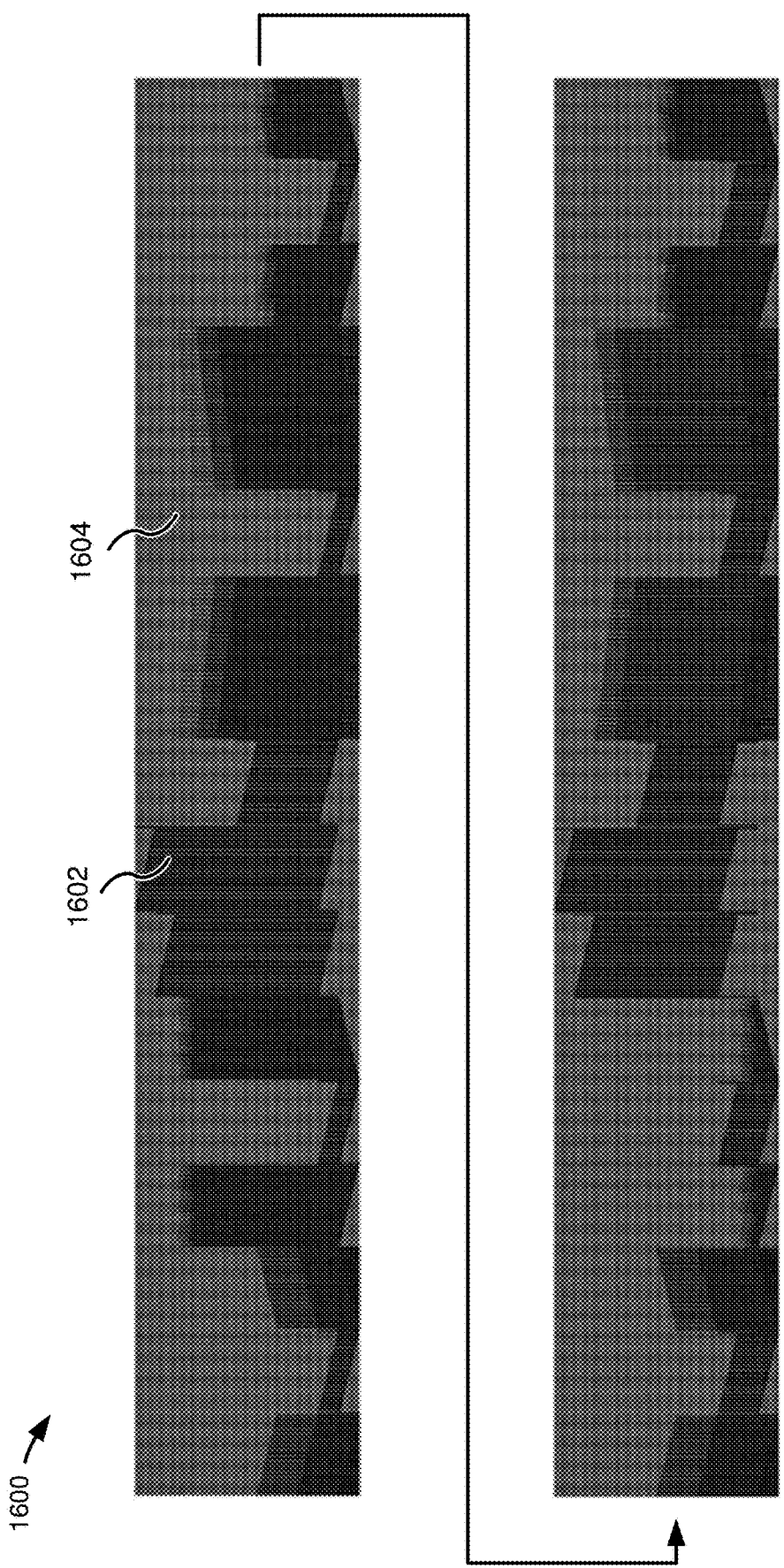
FIG. 16 is an image showing a Toffoli network produced by the ReVer compiler, the Toffoli network representing a reversible circuit implementing 2 rounds of the SHA-2 algorithm.

FIG. 16 is an image showing a Toffoli network representation 1600 of a reversible circuit. In particular. FIG. 16 shows a reversible circuit for performing the SHA-2 hash function, the Toffoli network being produced by the ReVer compiler. The darker regions (an example of which is shown at 1602) indicate a higher concentration of Toffoli gates, whereas the lighter regions (an example of which is shown at 1604) indicate a lower concentration of Toffoli gates. Further, the illustrated circuit performs two rounds of the SHA-2 hash function, the first round being performed by the upper half of the circuit, the second round being performed by the lower half of the circuit. In the illustrated implementation, the circuit operations are performed from left to right. FIG. 16 illustrates the complexity of a typical reversible circuit, and thus the desirability of verifying the circuit's proper operation, reducing its ancilla bit usage, and/or returning ancilla bits to their original state to allow for their re-use.

Several tools have been developed for synthesizing reversible circuits, ranging from low-level methods for small circuits to high-level programming languages and compilers. Here, the focus is primarily on the latter class-methods for compiling high-level code to reversible circuits. Such compilers commonly perform optimization, as the number of bits used quickly grows with the standard techniques for achieving reversibility. The question, as with general purpose compilers, is whether or not one can trust these optimizations.

In most cases, extensive testing of compiled programs is sufficient to establish the correctness of both the source program and its translation to a target architecture by the compiler. Formal methods are typically reserved for safety- (or mission-) critical applications: for instance, formal verification is a desirable step in modern computer-aided circuit design due largely to the high cost of a recall. With the recent focus on resource estimation in quantum computing in order to determine its practical efficacy; validation is becoming increasingly important so as to assure that resource counts are not being incorrectly reported. Moreover, small bugs that affect only a few subroutines can impact quantum computations, which effectively runs a circuit on all possible inputs at once. For this reason, it is desirable for compiled reversible circuits to have some level of formal guarantees.

Aspects and embodiments of the technology disclosed herein are described with reference to a nonlimiting, example compiler for the REVS language which has been written and proven correct in the dependently typed language F*.

This example compiler and language application should not be construed as limiting, however, as embodiments of the disclosed technology are more generally applicable to other compiler embodiments for analyzing other reversible circuit languages. In particular examples discussed herein, circuits compiled with REVER are verified to preserve the semantics of the source REVS program, which have been formalized for the first time, and to clean ancillary bits used (e.g., all ancillary bits used) so that they may be used later in other computations. In addition to formal verification of the compiler, REVER provides an assertion checker which can be used to formally verify the source program itself, allowing effective end-to-end verification of reversible circuits. Also disclosed herein is a type inference algorithm for REVS mixing subtyping and record concatenation, a known hard problem.

The disclosed technology encompasses a variety of improvements and compiler embodiments, including one or more of the following: a formal semantic model of REVS which respect to the original compiler; a compiler for REVS called REVER, written in F* (e.g., having two modes: direct to circuit and Boolean expression compilation, the latter of which is space efficient); a type inference algorithm (e.g., for REVS) used to infer and allocate circuit inputs; a verification technique that generates and then solves a set of type constraints using bound maps; and machine-checked proofs that verify the correctness of REVER, specifically that the compiled reversible circuits faithfully implement the input program's semantics and that all ancillas used are returned to their initial state.

Due to the reversibility requirement of quantum computing, quantum programming languages and compilers typically have methods for generating reversible circuits. Quantum programming languages typically allow compilation of classical, irreversible code in order to minimize the effort of porting existing code into the quantum domain. In QCL, for example, "pseudo-classical" operators—classical functions meant to be run on a quantum computer—are written in an imperative style and compiled with automatic ancilla management. As in REVS, such code manipulates registers of bits, splitting off sub-registers and concatenating them together. The more recent Quipper automatically generates reversible circuits from classical code by a process called lifting: using Haskell metaprogramming. Quipper lifts the classical code to the reversible domain with automated ancilla management. However, little space optimization is performed.

Other approaches to high-level synthesis of reversible circuits are based on writing code in reversible programming languages—that is, the programs themselves are written in reversible way. Perhaps most notable in this line of research is Janus and its various extensions. These languages typically feature a reversible update and some bi-directional control operators, such as if statements with exit assertions. These flow-chart-like languages have different design goals and target architectures from the higher-level approach taken here.

Verification of reversible circuits could be considered from the viewpoint of checking equivalence against a benchmark circuit or specification. Such an approach can double as both program verification and translation validation, but every compiled circuit would need to be verified separately. Moreover, a program that is easy to formally verify may be translated into a circuit with hundreds of bits, and would thus be very difficult to verify. Embodiments of the disclosed technology concern a different approach in which the reversible circuit compiler itself is verified, thus reducing (or eliminating) the need to verify every compiled circuit separately.

The description below is organized as follows: in the following section, an overview of reversible computing and the original REVS compiler is presented. Section 4 formalizes REVS and introduces a semantic model, as well as example internal and target languages. Section 5 describes exemplary embodiments of the disclosed compilation methods and Section 6 details an example type system and inference algorithm that can be used with embodiments of the disclsoed technology. Section 7 presents machine-checked correctness proofs for REVER. Section 8 compares example compiled circuits to those of REVS. Section 9 discloses various example embodiments for applying the disclosed technology to reversible computing compilers in general. Section 12 provides concluding remarks.

3. Reversible Computing

Reversible functions are Boolean functions $f: \{0, 1\}^n \rightarrow \{0, 1\}^n$ which can be inverted on all outputs (e.g., precisely those functions which correspond to permutations of a set of cardinality $2^n$, for some $n \in \mathbb{N}$. As with classical circuits, reversible functions can be constructed from universal gate sets—for instance, it is known that the Toffoli gate which maps $(x, y, z) \mapsto (x, y, z \oplus xy)$, together with the controlled-NOT gate (CNOT) which maps $(x, y) \mapsto (x, x \oplus y)$ and the NOT gate which maps $x \mapsto x \oplus 1$, is universal for reversible computation. In particular, any given target function, when considered as a permutation $\pi_f$ can be implemented over this gate set at the expense of at most 1 additional bit.

The number of Toffoli gates used in the implementation of a given permutation $\pi_f$ is the basic measure of complexity. Indeed, it is known from the theory of fault-tolerant quantum computing that the Toffoli gate has a substantial cost, whereas the cost of so-called Clifford gates, such as CNOT and NOT, can usually be neglected. Another important metric that is associated to a reversible circuit is the amount of scratch space required to implement a given target function (temporary bits which store intermediate results of a computation). In quantum computing, such bits are commonly denoted as ancilla or ancillary bits. A significant difference to classical computing is that scratch bits cannot just be overwritten when they are no longer needed: any ancilla that is used as scratch space during a reversible computation must be returned to its initial value-commonly assumed to be 0—computationally. Moreover, if an ancilla bit is not "cleaned" or "cleaned up" in this way, then, in a quantum computation, it may remain entangled with the computational registers which in turn can destroy the desired interferences that are crucial for many quantum algorithms.

FIG. 1 is a schematic block diagram showing an example reversible circuit 100 over NOT. CNOT, and Toffoli gates computing the NOR function. In particular, FIG. 1 shows a Toffoli network computing the NOR function $f(a, b) = \overline{a \vee b}$. When read from left to right and numbering the qubits from top to bottom as 110, 111, 112, 113, the applied gates are Toffoli 110 111 112 (gate 120). CNOT 112 110 (gate 121), CNOT 111 110 (gate 122), CNOT 110 113 (gate 123), CNOT 111 110 (gate 124), CNOT 112 110 (gate 125), Toffoli 110 111 112 (gate 126), and NOT 113 (gate 127). Qubit 112 is initialized in the zero state and returned clean (in the zero state), whereas qubit 113 is used to store the result $f(a, b)$. For larger circuits, it becomes a non-trivial problem to assert (a) that indeed the correct target function $f$ is implemented and (b) that indeed all ancillas that are not outputs are returned to 0.

From Bennett's work on reversible Turing machines, it follows that any function can be implemented by a suitable reversible circuit: if an m-bit function $x \mapsto f(x)$ can be implemented with K gates over $\{NOT, AND\}$, then the reversible function $(x, y) \mapsto (x, y \oplus f(x))$ can be implemented with at most 2K+n gates over the Toffoli gate set. The basic idea behind Bennett's method is to replace all AND gates with Toffoli gates, then perform the computation, copy out the result, and undo the computation.

Figure 2:
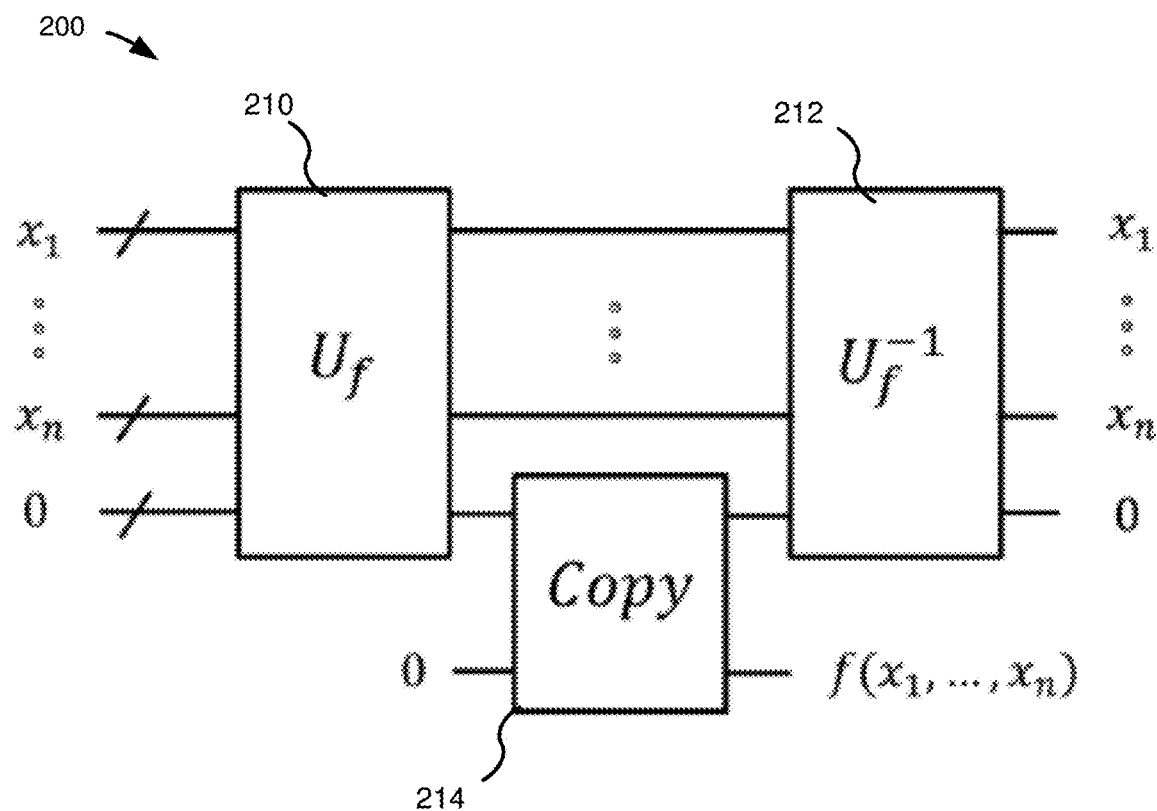
FIG. 2 is a schematic block diagram illustrating an example reversible circuit computing $f(x_1, \ldots, x_n)$ using the Bennett approach.

This strategy is illustrated in FIG. 2, which is a schematic block diagram illustrating an example reversible circuit 200 computing $f(x_1 \ldots, x_m)$ using the Bennett approach. In FIG.

2, box 210 labeled $U_f$ corresponds to $f$ with all AND gates substituted with Toffoli gates, box 214 corresponds to the circuit for copying out the result, and the inverse box 212 is simply obtained by reversing the order of all gates in $U_f$. Bennett's method has been implemented in the Haskell-based quantum programming language Quipper via a monad that allows lifting of classical functions to Toffoli networks with the Bennett method. One disadvantage of Bennett's method is the large number of ancillas it requires as the required memory scales proportional to the circuit size of the initial, irreversible function $f$. In A. Parent, M. Roetteler, and K. M. Svore, "Reversible circuit compilation with space constraints", arXiv preprint arXiv:1510.00377 (2015) and in U.S. Patent Application No. 62/172,727, entitled "REVERSIBLE CIRCUIT COMPILATION WITH SPACE CONSTRAINTS" and filed on Jun. 8, 2015, example techniques are disclosed for improving the space-complexity of Bennett's strategy by generating circuits that are space-efficient with respect to the number of bits used. Embodiments of the disclosed technology build on that work and include formalizing REVS and developing a verified compiler without much loss in efficiency.

4. Example Languages

In this section, an example formal definition of REVS is given, as well as the intermediate and target languages of the example compiler. This particular formal definition is given by way of example only and should not be construed as limiting. Instead, the underlying principles used to arrive at the formal definition exemplify an approach that can be more generally applied to any reversible circuit compiler.

4.1 Example Source

Figure 3:
FIG. 3 shows an example syntax of REVS.

Example abstract syntax 300 of REVS is presented in FIG. 3 The core of the language is an imperative language over Boolean and array (register) types. The language is further extended with ML-style functional features, namely first-class functions and let definitions, and a reversible domain-specific construct clean.

In addition to the basic syntax of FIG. 3, the following derived operations are added in embodiments of the disclosed technology:

not $t \triangleq \text{true} \oplus t, t_1 \| t_2 \triangleq (t_1 \,\&\&\, t_2) <> (t_1 < > t_2)$, if $t_1$ then $t_2$ else $t_3 \triangleq (t_1 \,\&\&\, t_2) <> (\text{not } t_1 \,\&\&\, t_3)$, for $x$ in $i \ldots j$ do $t \triangleq t[x \mapsto i]; \ldots ; t[x \mapsto j]$.

The example REVER compiler uses F # as a meta-language to generate REVS code with particular register sizes and indices, possibly computed by some more complex program. Writing an F # program that generates REVS code is similar in effect to writing in a hardware description language. The example embodiments discussed below use F #'s quotations mechanism to achieve this by writing REVS programs in quotations <@ . . . @>. Note that unlike languages, such as Quipper, the example embodiments assume a strictly combinational target architecture that does not allow computations in the meta-language to depend on computations within REVS.

FIG. 4 is a diagram illustrating example code 400 for an implementation of the SHA-2 algorithm with n rounds, using a meta-function modAdd. The 256-bit Secure Hash Algorithm 2 is a hash algorithm which performs a series of modular additions and functions on 32-bit chunks of a 256-bit hash value, before rotating the register and repeating for a number of rounds. In the REVS implementation, shown in FIG. 4, this is achieved by a function hash which takes a length 256 register, then makes calls to modular adders with different 32-bit slices. At the end of the round, the entire register is rotated 32 bits with the rotate command.

This section describes semantics for an example compiler illustrating aspects of the disclosed technology. In particular, this section discloses a semantic model of REVS. The example model includes the following nonlimiting characteristics: keeping the semantics close to the original implementation (e.g., REVS); and simplying the task of formal verification. The result is a somewhat non-standard semantics that is nonetheless intuitive for the programmer. Moreover, the particular semantic model naturally enforces a style of programming that results in efficient circuits and allows common design patterns to be optimized.

A fuller set of semantics of REVS is presented in block diagram 500 of FIG. 5. In particular, FIG. 5 presents the semantics as a relation "$\Rightarrow$" that is a subset of Configx Config on configurations—pairs of terms and Boolean-valued stores. A notable feature of the semantic model is that Boolean, or bit, values are allocated on the store. Specifically. Boolean constants and expressions are modeled by allocating a new location on the store to hold its value—as a result, all Boolean values, including constants, are mutable. All other values are immutable.

The allocation of Boolean values on the store serves a variety of purposes, including one or more of: to give the programmer fine grain control over how many bits are allocated, and to provide a simple and efficient model of registers—arrays of bits. In studying pseudo-code for low-level bitwise operations. e.g., arithmetic and cryptographic functions, it was observed that most algorithms were naturally specified by a combination of array-type accesses—modifying individual elements of bit arrays—and list-type manipulations—splitting and merging bit arrays. While these patterns could be implemented with arrays, most algorithms would require either complex index book-keeping by the programmer or extraneous copying of arrays: in the latter case, circuits could be optimized to do away with unnecessary copies, but this complicates the process of formal verification. In particular, embodiments of the disclosed technology aim to compile efficient circuits with little extrinsic optimization.

The semantics of $\oplus$ and $\wedge$ are also notable in that they first reduce both arguments to locations, then retrieve their value. This allows programmers to write statements whose value may not be immediately apparent—e.g., x<> (x←y; y), which under these semantics will always evaluate to 0. The benefit of this definition is that it allows the compiler to perform optimizations without a significant burden on the programmer (see. e.g., Section 5).

Semantically, the clean and assert commands have little to no effect, other than to evaluate their argument. In the case of the assert statement, while an assertion could be modeled with reversible circuits, it is unlikely that any circuit design would ever have a use for such a construct; instead, in exemplary embodiments of the disclosed technology, assertions are used for program verification by the compiler. In embodiments of the disclosed technology, clean statements have a similar interpretation—rather than having the compiler generate circuit code cleaning a particular bit, they are viewed as compiler directives asserting that a particular bit is in the zero state. The location is then freed for use by the rest of the program, making the statement analogous to free in other languages. Practically speaking this statement is primarily useful in the form clean x for some identifier x.

4.2 Boolean Expressions

The nonlimiting example compiler discussed herein uses XOR-AND Boolean expressions—single output classical circuits over XOR and AND gates—as an intermediate representation/language. Compilation from Boolean expressions into reversible circuits forms the main "code generation" step of the example compiler. The following paragraphs provide a brief description of its syntax and semantics.

A Boolean expression is defined as an expression over Boolean constants, variable indices, and logical $\oplus$ and $\wedge$ operators. Explicitly, the following definitions apply:

$$BExp \; B ::= 0 \mid 1 \mid i \in \mathbb{N} \mid B_1 \oplus B_2 \mid B_1 \wedge B_2.$$

Note that the symbols 0, 1, $\oplus$ and $\wedge$ are used interchangeably with their interpretation in the Boolean field $\mathbb{F}_2$. Further, vars(B) is used to refer to the set of variables used in B.

In the examples considered herein, a Boolean expression is interpreted as a function from (total) Boolean-valued states to Booleans. In particular, State=$\mathbb{N} \to \mathbb{B}$ and the semantics of a Boolean expression are denoted by $[[B]]$: State$\to \mathbb{B}$. The formal definition of $[[B]]$ is included below for completeness:

$$[[0]]s=0 \quad [[1]]s=1 \quad [[i]]s=s(i)$$

$$[[B_1 \oplus B_2]]s=[[B_1]]s \oplus [[B_2]]s$$

$$[[B_1 \wedge B_2]]s=[[B_1]]s \wedge [[B_2]]s$$

4.3 Target Architecture

The example compiler (REVER) compiles to combinational, reversible circuits over NOT, controlled-NOT (CNOT), and Toffoli gates. In certain examples, combinational circuits refer to a series of logic gates applied to bits with no external means of control or memory—effectively pure logical functions. This model is suitable for implementing classical functions and oracles within quantum computations.

More formally, and for the examples considered herein, the following definitions can be applied:

$$Circ \; C ::= - \mid NOT \; i \mid CNOT \; ij \mid Toffoli \; ijk \mid C_1 :: C_2.$$

All but the last bit in each gate is called a control, whereas the final bit is denoted as the target. Only the target is modified by a gate. Further, use(C), mod(C) and control(C) is used to denote the set of bit indices that are used in, modified by, or used as a control in the circuit C, respectively. Still further, a circuit is well-formed if no gate contains more than one reference to a bit—the bits used in each Controlled-Not or Toffoli gate are distinct.

In certain embodiments of the disclosed technology and similar to Boolean expressions, a circuit is interpreted as a function from states (maps from indices to Boolean values) to states, given by applying each gate which updates the previous state in order. In accordance with some embodiments of the disclosed technology, the formal definition of the semantics of a reversible circuit C, given by $[[C]]$: State$\to$State, is:

$$[[NOT \; i]]s=s[i \mapsto \neg s(i)]$$

$$[[CNOT \; ij]]s=s[j \mapsto s(i) \oplus s(j)]$$

$$[[Toffoli \; ijk]]s=s[k \mapsto (s(i) \wedge s(j)) \oplus s(k)]$$

$$[[-]]s=s \; [[C_1::C_2]]s=([[C_2]] \circ [[C_1]])s$$

In this example, $s[x \mapsto y]$ is used to denote that function that maps x to y, and all other inputs z to s(z); here, $[x \mapsto y]$ is used to denote other substitutions as well.

5. Compilation

In this section, example implementations of a compiler that was verified using the disclosed technology are discussed. In particular, this section discloses aspects of implementations of REVER. One nonlimiting example compiler consists of 4381 lines of non-blank code in a common subset of F* and F#, with a front-end to evaluate and translate F# quotations into REVS expressions. The core of the compiler (performing compilation from the abstract syntax of REVS into reversible circuits) was proven correct with F*.

5.1 Boolean Expression Compilation

The core of the example compiler's code generation (REVER's code generation) is a compiler from Boolean expressions into reversible circuits. In particular implementations discussed herein, the method employed in A. Parent. M. Roetteler, and K. M. Svore, "Reversible circuit compilation with space constraints", arXiv preprint arXiv: 1510.00377 (2015), was used, with the eager cleanup option employed as discussed in Parent et al.

As a Boolean expression is already in the form of an irreversible classical circuit, the main job of the compiler is to allocate ancillas to store sub-expressions whenever necessary. The example embodiment of REVER does this by maintaining a global ancilla heap, which keeps track of the currently available (zero-valued) ancillary bits. Cleaned ancillas (ancillas returned to the zero state) may be pushed back onto the heap, and allocations have been formally verified to return previously used ancillas if any are available, hence not using any extra space.

The function compile-BExp, shown in pseudo-code in Algorithm 1 below, takes a Boolean expression B and a target bit i then generates a reversible circuit computing i$\oplus$B. Note that ancillas are only allocated to store sub-expressions of $\wedge$ expressions, since $\oplus$ is associative.

---

Algorithm 1 Boolean expression compiler.

```
function COMPILE-BEXP(B, i) // Global ancilla heap ξ
    if B = 0 then -
    else if B = 1 then NOT i
    else if B = j then CNOT j i
    else if B = B₁ ⊕ B₂ then
        compile-BExp(B₁, i) :: compile-BExp(B₂, i)
    else // B = B₁ ∧ B₂
        a₁ ← pop(ξ), C₁ ← compile-BExp(B₁, a₁)
        a₂ ← pop(ξ), C₂ ← compile-BExp(B₂, a₂)
        C₁ :: C₂ :: Toffoli a₁ a₂ i
    end if
end function
```

---

The definition of compile-BExp above is adequate to generate a reversible circuit computing the Boolean expression, but it leaves many garbage bits that take up space and need to be cleaned before they can be re-used. Example embodiments of REVS provide two main modes of cleanup for Boolean expressions: eager and lazy. The former performs cleanup after each recursive call, while the latter performs one cleanup after the entire Boolean expression is computed. The difference is that the eager strategy uses fewer bits, but requires more gates as sub-expressions may need to be re-computed. While only these two strategies are discussed herein, the problem of finding a good tradeoff between bits used and number of gates can be formalized as pebble games and is readily expandable to a variety of different strategies.

To facilitate the cleanup—or uncomputing—of a circuit, and in certain example implementations, the restricted inverse is defined as $$C|_A^{-1}$$

of C with respect to a set of bits $A \subset \mathbb{N}$ reversing the gates of C, and removing any gates with a target in A. For instance:

$$(CNOTij)|_A^{-1} = \begin{cases} - & \text{if } j \in A \\ CNOTij & \text{otherwise} \end{cases}$$

The other cases are defined similarly.

The restricted inverse allows the temporary values of a reversible computation to be uncomputed without affecting any of the target bits. In particular, if C=compile-BExp(B,i), then the circuit $$C :: C|_{\{i\}}^{-1}$$

maps a state s to $s[i \mapsto [[B]]s \oplus s(i)]$. Intuitively, since no bits contained in A are modified, the restricted inverse preserves their values; that the restricted inverse uncomputes the values of the remaining bits is more difficult to see, but it can be observed that if the computation does not depend on the value of a bit in A, the computation will be inverted. This statement is formalized and proven in Section 7 below. The example eager and lazy cleanup strategies are defined respectively by applying this cleanup at every recursive call to compile-BExp or to just the outer-most call. In order to re-use ancilla bits that have been cleaned, they are pushed back onto the heap.

5.2 REvs Compilation

In studying the REVS compiler, it was observed that most of what the compiler was doing was evaluating the non-Boolean parts of the program—effectively bookkeeping for registers—only generating circuits for a small kernel of cases. As a result, transformations to different Boolean representations (e.g., circuits and/or dependence graphs) as well as the interpreter itself reused significant portions of this bookkeeping code. To make use of this redundancy to simplify both writing and verifying the compiler, example implementations of REVER were designed as a partial evaluator parameterized by an abstract machine. As a side effect, a unique and intuitive model for circuit compilation similar to staged computation was arrived at.

Example implementations of the REVER compiler work by evaluating the program with an abstract machine providing mechanisms for initializing and assigning locations on the store to Boolean expressions. In particular, an interpretation $\mathscr{I}$ comprises a domain D and 2 operations:

assign: $D \times \mathbb{N} \times BExp \to D$ eval: $D \times \mathbb{N} \times State \to \mathbb{B}$ Formally, a series of assignments in an interpretation builds a Boolean computation or circuit within a specific model (e.g., classical, reversible, different gate sets) which may be simulated on an initial state. Practically speaking, it abstracts the store in FIG. 5 and allows delayed computation or additional processing of the Boolean expression stored in a cell, which may be mapped into reversible circuits immediately or after the entire program has been evaluated. Some examples of interpretations are provided below.

Example 1

The standard interpretation $\mathscr{I}_{standard}$ has domain Store= $\mathbb{N} \to \mathbb{B}$, together with the operations $\text{assign}_{standard}(\sigma,l,B)=\sigma[l \mapsto [[B]]\sigma]$ $\text{eval}_{standard}(\sigma,l,s)=\sigma(l)$.

Partial evaluation over the standard interpretation coincides with the operational semantics of REVS.

Example 2

The Boolean expression interpretation $\mathscr{I}_{BExp}$ has domain $\mathbb{N} \to BExp$, together with the operations $\text{assign}_{BExp}(\sigma,l,B)=\sigma[l,\sigma \mapsto B[l' \in B \mapsto \sigma(l')]]$ $\text{eval}_{BExp}(\sigma,l,s)=[[\sigma(l)]]s$.

The Boolean expression interpretation can be viewed as the standard interpretation with deferred evaluation—that is, it expands Boolean expressions over locations to Boolean expressions over a set of variables, but defers evaluation of those expressions until a set of initial values are supplied. Effectively the result is the expression (or expressions) the program computes on a given input.

Example 3

The reversible circuit interpretation $\mathscr{I}_{circuit}$ is somewhat more complex. It has domain $(\mathbb{N} \to \mathbb{N}) \times Circ$, where the first element maps program-level locations to circuit-level bits and the second is a reversible circuit. The two operations are defined as follows—note that assign uses the global ancilla heap $\xi$:

$\text{assign}_{circuit}((t,C),l,B)=(t[l \mapsto i],C::C')$ where $i=\text{pop}(\xi)$, $C'=\text{compile-}BExp(B[l' \in \text{vars}(B) \mapsto \sigma(l')],i)$ $\text{eval}_{circuit}((t,C),l,s)=s'(\sigma(l))$, where $s'=[[C]]s$.

This interpretation generates a reversible circuit directly from the program by maintaining a mapping from program locations to bits. When a location is overwritten, a new ancilla i is allocated and the expression B⊕i is compiled into a circuit. Evaluation amounts to running the circuit on an initial state, then retrieving the value at a particular bit.

The example REVER compiler provides implementations of the interpretations above. It is also possible to define an interpretation that generates mutable dependence diagrams, which were used as an intermediate representation in A. Parent. M. Roetteler, and K. M. Svore, "Reversible circuit compilation with space constraints", arXiv preprint arXiv: 1510.00377 (2015), to compile space-efficient reversible circuits.

Given an interpretation $\mathscr{I}$ with domain D, REVER evaluates a term t over $\sigma \in D$ according to the semantics of FIG. 5, using the assignment function to handle all writes to the store. Here. $\Rightarrow \mathscr{I}$ is used to denote the evaluation relation over $\mathscr{I}$. In this way, evaluating a program and compiling a program to, for instance, a circuit look almost identical. As will be shown later, this can help simplify the problem of verification.

The example compiler discussed herein supports two modes of compilation: a default mode, and a space-efficient mode. It should be understood that compilers with additional or alternative modes of compilation are also possible and considered to be within the scope of this disclosed. In the example compiler, the default mode evaluates the program using the circuit interpretation, and simply returns the circuit and output bit(s). The space-efficient mode, on the other hand, evaluates the program to a list of Boolean expressions over the inputs, by partial evaluation with the Boolean expression interpretation. The Boolean expression compiler is then used to compile each Boolean expression into a circuit. This method effectively erases the program structure, allowing the Boolean expression compiler to more effectively manage the allocation of ancillas for sub-expressions and to apply optimizations, described below. However, the duplication of sub-expressions leads to an exponential blowup, making this compilation method not scalable.

5.3 Input Vs Parameters

Quipper makes a distinction between function inputs and parameters, the latter of which are available at compile time. In this way the language provides a static, structural divide between run-time and compile-time computations. Partial evaluation on the other hand effectively erases this distinction, any structural limitations owing to the limitations of the target architectures (for instance, unbounded for loops cannot be compiled to a combinational circuit). Practically speaking, this means the programmer can use the same code to perform more or less computation at the circuit level—for instance, an adder may be partially instantiated to compile a circuit performing addition by a constant, without making any changes to the code itself. The downside of this method is it can be more difficult for the programmer to determine what the compiled circuit is actually computing. While most language features in REVS do not currently have a circuit implementation, more support can be added for types and constructs which may be computed either at compile-time or run-time, such as integers and array indexing.

5.4 Optimization Passes

Both methods of compilation described above suffer from the problem that more ancillas may be allocated than are actually needed, due to the program structure. In example embodiments discussed herein, some optimizations are performed, which have been verified to be correct, in order to reduce ancilla usage for some common patterns. Example patterns and optimizations are discussed in more detail below.

5.4.1 XOR-Equal

In the circuit interpretation, a new ancilla is allocated by default whenever a location is updated, since updates are generally not reversible. However, in the case when an update can be rewritten as an XOR of the target bit, the update can be performed reversibly. Specifically, given a Boolean expression B and target bit i, an example optimization process tries to factor B as i⊕B' where i∉vars(B'), a condition required for the correctness of compile-BExp (see Section 7). If such a factoring exists, rather than allocate an ancilla to store the result, the expression B' with target i is compiled. In practice, this significantly reduces the number of ancillas used.

5.4.2 Boolean Simplifications

Before compiling a Boolean expression, an example optimization process used in certain embodiments of the disclose technology performs basic simplifications. e.g., short circuiting AND's and XOR's, whenever possible. ANDs can also be distributed to rewrite the expression in positive-polarity ESOP (exclusive sum-of-products) form. The benefit of this transformation is that it produces circuits with the minimal number of ancillas using compile-BExp without eager cleanup—in particular, the compiled circuit uses k−2 ancilla bits where k is the highest degree of any product in the ESOP form. Its minimality with respect to compile-BExp can be observed by noting that the positive-polarity ESOP form of a Boolean function is unique, so any equivalent expression over AND and XOR must contain a product of length k and hence use at least k−2 ancilla bits.

If cleanup is performed eagerly, the number of bits used depends on the factoring of a given product into binary products. In particular, the product $((((a \wedge b) \wedge c) \wedge d) \wedge e) \wedge f$ would require 4 ancilla bits using the eager cleanup scheme, while the product $((a \wedge b) \wedge (c \wedge d)) \wedge (e \wedge f)$ would use only 3 extra bits.

5.4.3 Growing Expressions Text

One difference between example partial evaluators of the disclosed technology and the semantics of FIG. 5 is that the compiler evaluates Boolean terms to Boolean expressions rather than locations directly. For instance, given a term $t_1$ && $t_2$, the compiler reduces each sub-expression $t_1$ and $t_2$ to Boolean expressions rather than locations—in comparison, the formal semantic definition reduces both $t_1$ and $t_2$ to locations first. The correctness of this approach is apparent since all side-effectual computation is carried out during the reduction of $t_1$ and $t_2$ to Boolean expressions.

This method of growing expressions allows larger Boolean expressions to be optimized and efficiently compiled to circuits. In particular, a straightforward implementation of the operational semantics would require every binary sub-expression to be computed using an ancilla. In reality, this is not necessary, as in the case of compiling $t_1 <> t_2$, where no ancillas are allocated. While the Boolean expression interpretation goes farther and expands all locations within a Boolean expression, the expression size grows exponentially and quickly becomes unmanageable—for certain examples, it was found that this was a good compromise between the number of bits used and scalability of compilation.

6. Type Inference

While the definition of REVER as a partial evaluator streamlines both development and verification, it leaves one issue: compiling functions. Semantically a function is a value, so the interpreter has nothing to do. In reality, the evaluator can be wrapped with a procedure that allocates locations for the function parameters, then proceeds to evaluate the body; however, to do so, the compiler needs to know how many locations to allocate.

Ideally, this would be handled by type annotations, but this can be unnatural and confusing as F # has no mechanism for syntax extensions or dependent types. Instead, example embodiments of the disclosed technology take the approach of using type inference together with a type system based on fixed-length registers. One of the practical benefits of such an inference approach is it functions as both optimization and verification by only allocating bits that are actually used in the program. In particular, embodiments of the inference approach exposed an off-by-one error in a REVS program by allocating fewer bits than were required by the algorithm.

Other solutions are also possible: for instance, the original REvs compiler had programmers allocate inputs manually rather than write functions. This led to a more complicated semantic model and somewhat unnatural looking programs.

On the other hand, the problem could be avoided by delaying bit allocation until after the circuit is compile. In general, the type inference approach may be preferable, as it simplifies verification, removing named variables from internal representations which complicate formal verification.

In certain example embodiments, the type system includes three basic types—the unit type, Booleans, and fixed-length registers—as well as the function type. As expected, indexing registers beyond their length causes a type error. To regain some polymorphism and flexibility the type system allows (structural) subtyping, in particular so that registers with greater size may be used anywhere a register with lesser size is required.

Type inference in systems with (structural) subtyping is generally considered a difficult problem. While many attempts have been made, they are typically not effective in practice. Given the simplicity of the type system used in embodiments of the reversible circuit compiler (in particular, the lack of non-subtype polymorphism), an inference approach based on constraint generation and bound maps is effective in practice.

Figure 6:
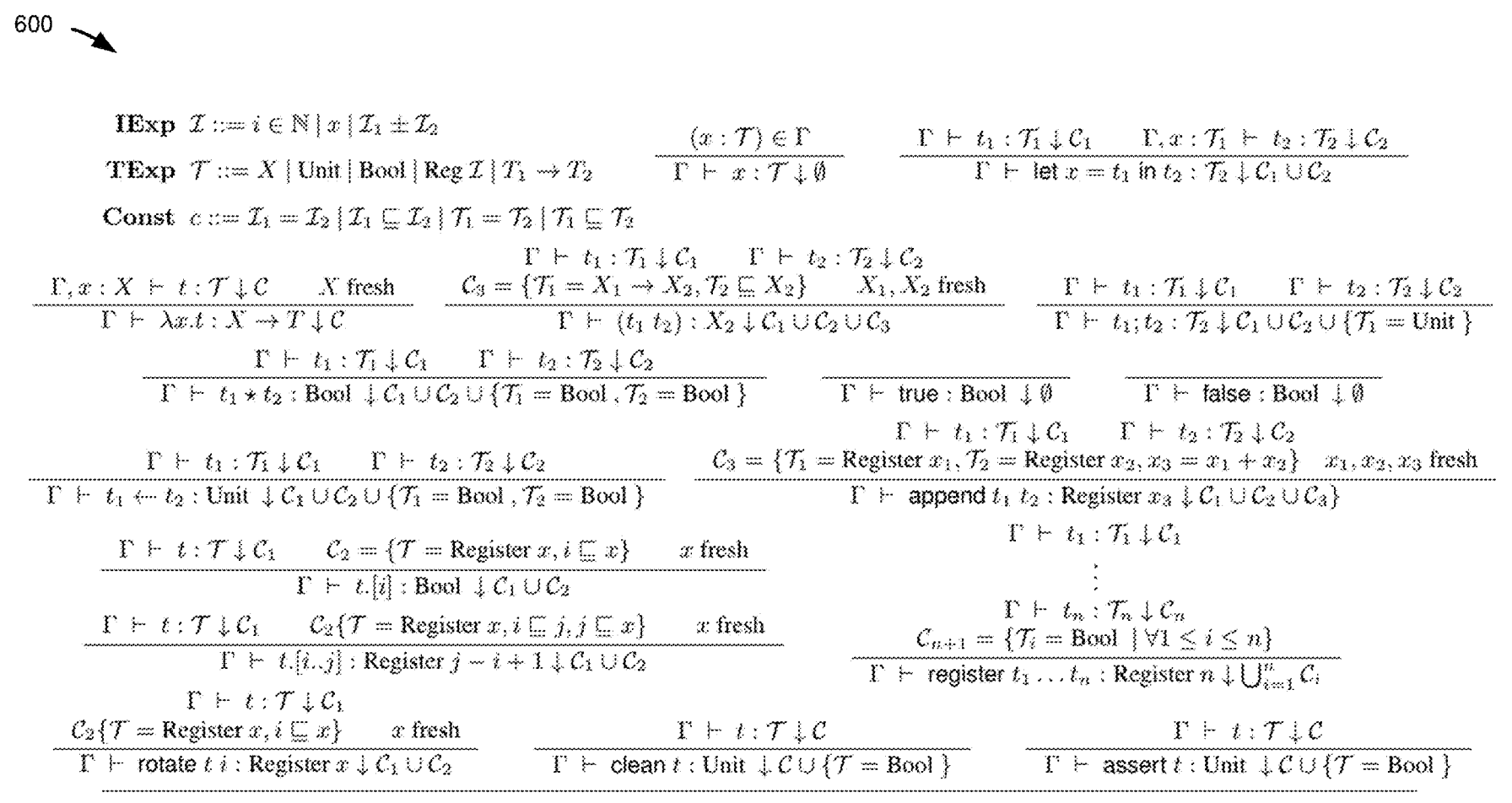

Diagram 600 of FIG. 6 summarizes algorithmic rules of an example type system, which specify a set of constraints that any valid typing most satisfy. Constraints are given over a language of type and integer expressions. Type expressions include the basic types of REVER, as well variables representing types and registers over integer expressions. Integer expressions are linear expressions over integer-valued variables and constants. Equality and order relations are defined on type expressions as expected, while the integer expression ordering corresponds to the reverse order on integers ($\geq$)—this is done so that the maximal solution to an integer constraint gives the smallest register size. Constraints may be equalities or order relations between expressions of the same kind.

Formally, a type substitution $\Theta$ is a mapping from type variables to elements of Type and integer variables to integers. In the example, the type $\mathcal{T}$ is denoted by $\Theta(\mathcal{T})$ with all variables replaced by their values in $\Theta$. Additionally, $\Theta$ satisfies the set of constraints C if every constraint is true after applying the substitutions. The relation $\Gamma \vdash t: \mathcal{T} \downarrow C$ means t can be given type $\Theta(\mathcal{T})$ for any type substitution satisfying C.

6.1 Constraint Solving

This section discloses example embodiments of a constraint solving process, which finds a type substitution satisfying a set of constraints C. In particular implementations, a combination of unification (see. e.g., L. Damas et al., "Principal type-schemes for functional programs," Proc. of the 9th ACM SIGPLAN-SIGACT Symposium on Principles of Programming Languages. POPL '82, pgs. 207-212 (1982)) and sets of upper and lower bounds for variables (similar to the method used in V. Trifonov et al., "Subtyping constrained types," Static Analysis, vol. 1145 of Lecture Notes in Computer Science, pgs. 349-365 (Springer Berlin Heidelberg 1996)) is used. An example implementation is termed "computeBounds" and is shown in pseudocode in Algorithm 2. The example technique illustrated by computeBounds iterates through a set of constraints performing unification and computing the closure of the constraints wherever possible. Bounds—both subtype and equality—on variables are translated to a range of type or integer expressions, possibly open at one end, and the technique maintains a set of such bounds for each variable. To reduce complex linear arithmetic constraints to a variable bound, a normalization procedure is used to write the constraint with a single positive polarity variable on one side.

In an example embodiment, after all constraints have translated to bounds, the technique iterates through the variables, simplifying and checking the set of upper and lower bounds. Any variable with no unassigned variable in its upper and lower bound sets is assigned the maximum value in the intersection of all its bounds, this process repeats until no variables are left unassigned.

More generally, the technique (Algorithm 2 shown below) computes a type substitution that satisfies a set of type constraints that are imposed by the given source program. The method is based on inferring upper and lower bounds for type variables, such as, for example, array bounds, which are translated into a system of inequality or range constraints. These constraints are then presented to a solver that, for example, solves any occurring equality constraints by unification. Further, the example solver merges all arithmetic constraints into a single constraint and reduces it to a normal form. And further, the example solver replaces each range query

---

Algorithm 2 Computation of bound sets.

---

```
function COMPUTEBOUNDS(C, θ)
    C is a set of constraints
    θ a set of (possible open at one end) ranges for each variable
    while c ∈ C do
        if c is T₁ = T₂ or I₁ = I₂ then use unification
        else if c is T ⊒ T or I ⊒ I then
            computeBounds(S \ {c}, θ)
        else if c is X ⊒ Unit or Unit ⊒ X then
            computeBounds(S \ {c}, θ ∪ {X ↦ [Unit , Unit ]})
        else if c is X ⊒ Bool or Bool ⊒ X then
            computeBounds(S \ {c}, θ ∪ {X ↦ [Bool , Bool ]})
        else if c is X ⊒ Register I then
            computeBounds(S \ {c} ∪ {I ⊒ x}, θ ∪ θ')
                where θ' = {X ↦ [Register x, Register x], x ↦ [I, ∞]}
        else if c is Register I ⊑ X then
            computeBounds(S \ {c} ∪ {x ⊑ I, θ ∪ θ')
                where θ' = {X ↦ [Register x, Register x], x ↦ [0, I]}
        else if c is X ⊑ T₁ → T₂ then
            computeBounds(S \ {c} ∪ {T₁ ⊒ T₁', T₂' ⊑ T₂, θ ∪ θ')
                where θ' = {X ↦ [T₁' → T₂', T₁' → T₂']}
        else if c is T₁ → T₂ ⊑ X then
            computeBounds(S \ {c} ∪ {T₁' ⊑ T₁, T₂ ⊑ T₂', θ ∪ θ')
                where θ' = {X ↦ [T₁' → T₂', T₁' → T₂']}
        else if c is X₁ ⊑ X₂ then
            computeBounds(S \ {c}, θ ∪ {X₁ ↦ [—, X₂]})
        else if c is x ⊑ I then
            computeBounds(S \ {c}, θ ∪ {x ↦ [—, I]}
        else if c is I ⊑ x then
            computeBounds(S \ {c}, θ ∪ {x ↦ [I, —]}
        else Fail
        end if
    end while
end function
```

--- of the form greater or equal a lower bound by said lower bound and each range query of the form less or equal an upper bound by said upper bound, and recursively checks that all arithmetic constraints are satisfied.

7. Verification

In this section, the verification of the example REVER compiler is discussed and the major theorems supporting the verification are proven. The theorems given in this section have been formally specified and proven using the F* compiler. First, theorems about the Boolean expression compiler are provided, and then used to prove properties about whole program compilation. The total verification of the example REVER compiler comprised around 1500 lines of code.

The original theorems and proofs are given in the Proof Listings at the end of this disclosure for reference.

7.1 Boolean Expression Compilation

Below is the main theorem establishing the correctness of compile-BExp with respect to the semantics of reversible circuits and Boolean expressions. It states that if the variables of B, the bits on the ancilla heap and the target are non-overlapping, then the circuit computes the function $i \oplus B$.

Theorem 1. Let B be a Boolean expression, $\xi$ be the global ancilla heap, $i \in \mathbb{N}$ and s be a map from bits to Boolean values. Suppose vars(B), $\xi$ and $\{i\}$ are all disjoint and $s(j)=0$ for all $j \in \xi$. Then $$s'(i) = s(i) \oplus [[B]]s$$

where s'=[[compile-BExp(B,i)]]s.

Proof.

Structural induction can be used on B. A recursive case is described, as the non recursive cases are trivial. Consider the case $B=B_1 \oplus B_2$. Since vars($B_1$) is clearly disjoint with $\xi$ and $\{i\}$, one can see by induction that $s_1(i)=s(i) \oplus [[B_1]]s$ where $s_1=[[$compile-BExp$(B_1,i)]]s$. Next, induction can be used to show that $s_2(i)=s_1(i) \oplus [[B_2]]s_1$, where $s_2=[[$compile-BExp$(B_2,i)]]s_1$. To do so, it is observed that since no new ancillas are added to $\xi$ by compile-BExp$(B_1,i)$, vars($B_2$), $\xi$ and $\{i\}$ remain disjoint. Furthermore, since the circuit compile-BExp$(B_1,i)$ does not modify any bits still on the heap, $s_1(j)=0$ for all $j \in \xi$ and hence $s_2=[[$compile-BExp$(B_2,i)]]s_1$ by induction. Finally by the definition of compile-BExp$(B_1 \oplus B_2, i)$ and the semantics of reversible circuits, $s_2=s'$. The $\wedge$ case is slightly more involved, by mostly follows from the same argument.

7.2 Cleanup

As remarked earlier, one desirable aspect of reversible computing is cleaning ancillas both to reduce space usage, and in quantum computing to prevent entangled qubits from influencing the computation. Moreover, the correctness of compiler cleanup is highly desirable to prove correctness of the compiler, as the compiler re-uses cleaned ancillas on the heap, potentially interfering with the precondition of Theorem 1. The following theorem can be used to establish the correctness of a cleanup method, stating that the uncompute transformation reverses all changes on bits not in the target set under the condition that no bits in the target set are used as controls.

Theorem 2. Let C be a well-formed reversible circuit and $A \subset \mathbb{N}$ be some set of bits. If $A \cap$ control$(C)=\emptyset$ then for all states s, $$s' = [[C :: C|_A^{-1}]]s$$

and any $i \notin A$, $$s(i)=s(i)$$

Theorem 2 largely relies on the below lemma, which can be verified by a simple inductive case analysis:

Lemma 1. Let $A \subset \mathbb{N}$ and s, s' be states such that for all $i \in A$, $s(i)=s'(i)$. If C is a reversible circuit where control$(()C) \subseteq A$, then $([[C]]s)(i)=([[C]]s')(i)$ for all $i \in A$.

Proof of Theorem 2.

The proof proceeds by induction on the length of C. The base case is trivial, so the following is considered: $C=C_1 :: C_2$. Without loss of generality, it is assumed that $C_1$ is a single gate. If $C_1$ does not use any bit in B, then $$C|_A^{-1} = C_2|_A^{-1} :: C_1,$$

so one can use the inductive hypothesis on $C_2$ and the fact that $C_1$ is self-inverse. On the other hand, if $C_1$ uses some $i \in A$, then i must be the target of $C_1$. Then $$C|_A^{-1} = C_2|_A^{-1},$$

so one needs to show that $s(i)=s'(i)$ where $$s' = [[C_1 :: C_2 :: C_2|_A^{-1}]]s$$

for all $i \notin A$. It is observed that $s(i)=s'(i)$ where $s'=[[C_1]]s$ for all $i \notin A$, so by Lemma 1 one has $$[[C_1 :: C_2 :: C_2|_A^{-1}]]s(i) = [[C_2 :: C_2|_A^{-1}]]s(i)$$

for all $i \notin A$. Thus by the inductive hypothesis, it can be seen that $s(i)=s'(i)$ where $$s' = [[C_1 :: C_2 :: C_2|_A^{-1}]]s$$

for all $i \notin A$, as desired.

Theorem 2, together with the fact that compile-BExp produces a well-formed circuit under disjointness constraints, gives the corollary below that Boolean expression compilation with cleanup correctly reverses the changes to every qubit except the target.

Corollary 1. Let B be a Boolean expression. $\xi$ be a the global ancilla heap and $i \in \mathbb{N}$ such that vars(B), $\xi$ and $\{i\}$ are all disjoint. Suppose compile-BExp(B, i)=C. Then for all $j \neq i$ and states s, $$s' = [[C \circ C|_{\{i\}}^{-1}]]s$$

we have $$s'(j)=s(j)$$

7.3 Optimizations

Correctness proofs for the optimization passes can be similarly derived, for example the correctness of the Boolean expression simplifications, expansion to ESOP form, and factoring of B as $i \oplus B'$ can be proven.

7.4 REVS Compilation

It was noted in Section 5 that the design of REVER as a partial evaluator simplifies proving correctness. That point is expanded on here, and in particular it is shown that if a relation between the states of two interpretations is preserved by assignment, then the evaluator also preserves the relation. The theorem below states this formally.

Theorem 3. Let $\mathscr{I}_1$, $\mathscr{I}_2$ be interpretations and suppose whenever $(\sigma_1, \sigma_2) \in R$ for some relation $R \subset \mathscr{I}_1 \times \mathscr{I}_2$, (assign$_1(\sigma_1,l,B)$, assign$_2(\sigma_2,l,B)) \in R$ for any l, B. Then for any term t, if $\langle t, \sigma_1 \rangle \Rightarrow \mathscr{I}_1 \langle v, \sigma_1' \rangle$ and $\langle t, \sigma_2 \rangle \Rightarrow \mathscr{I}_2 \langle v, \sigma_2' \rangle$, then $(\sigma_1', \sigma_2') \in R$. Theorem 3 lifts properties about interpretations to properties of evaluation over those abstract machines—in particular, one only needs to establish that assignment is correct for an interpretation to establish correctness of the corresponding evaluator/compiler. In practice this significantly reduces boilerplate proof code, which is useful as F* currently has limited support for automated induction.

piled circuits only modify the target and ancillas. The final condition effectively follows from a lemma stating that [[B]]s is equivalent to [[B[i∈vars(B)↦ σ(i)]]]([[C]]s)—evaluating the expression B gives the same result as running the circuit C then evaluating B by replacing every variable in B with the state of the corresponding bit. This can be proven by a straightforward induction on the structure of B.

TABLE 1

Bit & gate counts for both compilers in default mode.

| Benchmark | REVS | | | REVER | | |
|---|---|---|---|---|---|---|
| | bits | gates | Toffolis | bits | gates | Toffolis |
| carryRippleAdder 32 | 127 | 187 | 90 | 128 | 277 | 60 |
| carryRippleAdder 64 | 255 | 379 | 186 | 256 | 565 | 124 |
| mult 32 | 130 | 6016 | 4032 | 128 | 6111 | 4032 |
| mult 64 | 258 | 24320 | 16256 | 256 | 24511 | 16256 |
| carryLookahead 32 | 169 | 399 | 112 | 169 | 503 | 120 |
| carryLookahead 64 | 439 | 1116 | 322 | 439 | 1382 | 336 |
| modAdd 32 | 65 | 188 | 62 | 65 | 189 | 62 |
| modAdd 64 | 129 | 380 | 126 | 129 | 381 | 126 |
| cucarroAdder 32 | 129 | 98 | 32 | 65 | 99 | 32 |
| cucarroAdder 64 | 257 | 194 | 64 | 129 | 195 | 64 |
| ma4 | 17 | 24 | 8 | 17 | 24 | 8 |
| SHA-2 2 rounds | 577 | 2374 | 782 | 577 | 2388 | 782 |
| SHA-2 4 rounds | 833 | 4832 | 1592 | 833 | 4860 | 1592 |
| SHA-2 8 rounds | 1345 | 7712 | 3408 | 1345 | 10392 | 3408 |
| SHA-2 16 rounds | 2594 | 10336 | 7712 | 2594 | 23472 | 7712 |
| MD5 2 rounds | 7841 | 53824 | 18240 | 4769 | 45440 | 18240 |

Given two interpretations $\mathscr{I}_1$, $\mathscr{I}_1'$, it can be said that states σ and σ' of $\mathscr{I}_1$ and $\mathscr{I}_1'$ are observationally equivalent with respect to a set of initial values s∈State if for all i∈ℕ, eval $\mathscr{I}$ (σ, i, s)=eval $\mathscr{I}$ (σ',i,s). Further, one can say σ~$_s$σ' if σ and σ' are observationally equivalent with respect to s. The preservation of observational equivalence can be established between the three interpretations implemented in REVER, $\mathscr{I}_{standard}$, $\mathscr{I}_{BExp}$ and $\mathscr{I}_{circuit}$, to prove the correctness of the example compiler.

Theorem 4. For all states σ, σ' of $\mathscr{I}_{standard}$ and $\mathscr{I}_{BExp}$, respectively, and for all l∈ℕ B∈BExp, s∈State, if σ~$_s$σ' then $$\text{assign}_{standard}(\sigma,l,B)\sim_s\text{assign}_{BExp}(\sigma',l,B)$$

Proof.

Follows directly from the compositionality of [[B]].

Theorem 5. For all states σ, σ' of $\mathscr{I}_{standard}$ and $\mathscr{I}_{circuit}$, respectively, and for all l∈ℕ, B∈BExp, s∈State, if σ~$_s$σ' and s(i)=0 whenever i∈ξ, then $$\text{assign}_{standard}(\sigma,l,B)\sim_s\text{assign}_{circuit}(\sigma',l,B).$$

Moreover, the ancilla heap remains 0-filled.

Proof.

The correctness of the circuit interpretation is more difficult, since there is an extra level of abstraction where locations get mapped to bits within the circuit. Moreover, for certain examples, one has to add the extra condition that the ancilla heap is zero-filled, as observational equivalence alone is not strong enough to prove the theorem. As a result, the following three conditions are desirably established to prove the theorem:

the ancilla heap remains zero-filled.
 l is mapped to a bit containing the value of B, and
 no other location is mapped to a modified bit.

The first condition follows from the fact that Boolean expression compilation cannot add any new bits to the heap, while the second condition follows from the fact that com-

7.5 Assertion Checking

Along with the formal compiler verification, the example REVER compiler provides additional program verification tools in the form of a binary decision diagram (BDD) based assertion checker. BDD-based verification of both classical and reversible circuits is a technique that has been shown to be effective even on some large circuits. The example REVER compiler provides the option to perform a verification pass where the interpreter is run using BDDs to represent and store Boolean expressions. The interpreter checks that BDDs for asserted values are equal to true and cleaned variables have BDD false, or else an error is raised. REVER also provides translation validation by generating the BDD(s) for an entire program and checking their equivalence to the BDD(s) for the circuit outputs.

8. Experiments

Experiments were run to compare the ancilla usage, gate and Toffoli counts of circuits compiled by REVER to the original REVS compiler. Circuits were compiled for various arithmetic and cryptographic functions written in REVS using both compiler's regular and space-efficient modes. The results are reported in Tables 1 and 2, respectively.

The results show that in their default modes, the example embodiments of REVS and REVER are more-or-less evenly matched in terms of bit counts. In fact, REVER used fewer bits on average despite also

TABLE 2

Space-efficient compilation results.

| Benchmark | REVS | | | REVER | | |
|---|---|---|---|---|---|---|
| | bits | gates | Toffolis | bits | gates | Toffolis |
| carryRippleAdder 2 | 8 | 19 | 6 | 6 | 9 | 5 |
| carryRippleAdder 4 | 14 | 25 | 12 | 13 | 42 | 32 |

TABLE 2-continued

Space-efficient compilation results.

| Benchmark | REVS | | | REVER | | |
|---|---|---|---|---|---|---|
| | bits | gates | Toffolis | bits | gates | Toffolis |
| carryRippleAdder 8 | 30 | 61 | 36 | 29 | 10014 | 9996 |
| mult 2 | 9 | 16 | 12 | 11 | 529 | 473 |
| modAdd 2 | 5 | 8 | 2 | 3 | 8 | 4 |
| modAdd 4 | 9 | 20 | 6 | 14 | 533 | 510 |
| cucarroAdder 2 | 9 | 8 | 2 | 6 | 13 | 6 |
| cucarroAdder 4 | 17 | 14 | 4 | 14 | 78 | 66 |
| cucarroAdder 8 | 33 | 26 | 8 | 30 | 16406 | 16386 |
| ma4 | 17 | 24 | 8 | 16 | 12 | 12 | being certifiably correct. The example type inference algorithm also found bits allocated but never used in some REVS programs, which may have led to a reduction of bits. While REVER typically used more total gates than REVS, the number of Toffoli gates was only slightly worse for the carry lookahead adder, and significantly better for the carry ripple adder. Since Toffoli gates are generally considered much more costly than Not and controlled-Not gates, these gate counts are reasonable.

For the space efficient compilation scheme. REVER's Boolean expression compilation consistently produced circuits with fewer bits than REVS' dependence graph based scheme, as seen in Table 2. However, REVER used significantly more gates—almost 5000 times more in the most extreme case. This is because the transformation to a Boolean expression in ESOP form removes any redundancy in the expression, so any duplicated sub-expression is recomputed each time.

While the results show there is room for optimization of gate counts, they appear consistent with other verified compilers, which take some performance hit when compared to unverified compilers. Moreover, unverified compilers may use optimizations that aren't correct with respect to the target semantics, and hence the unverified compiler may falsely report better results—in fact semantics violations were found in REVS, including instances where ancillas were erroneously cleaned early.

9. Example Reversible Circuit Compilation/Verification Processes

Figure 7:
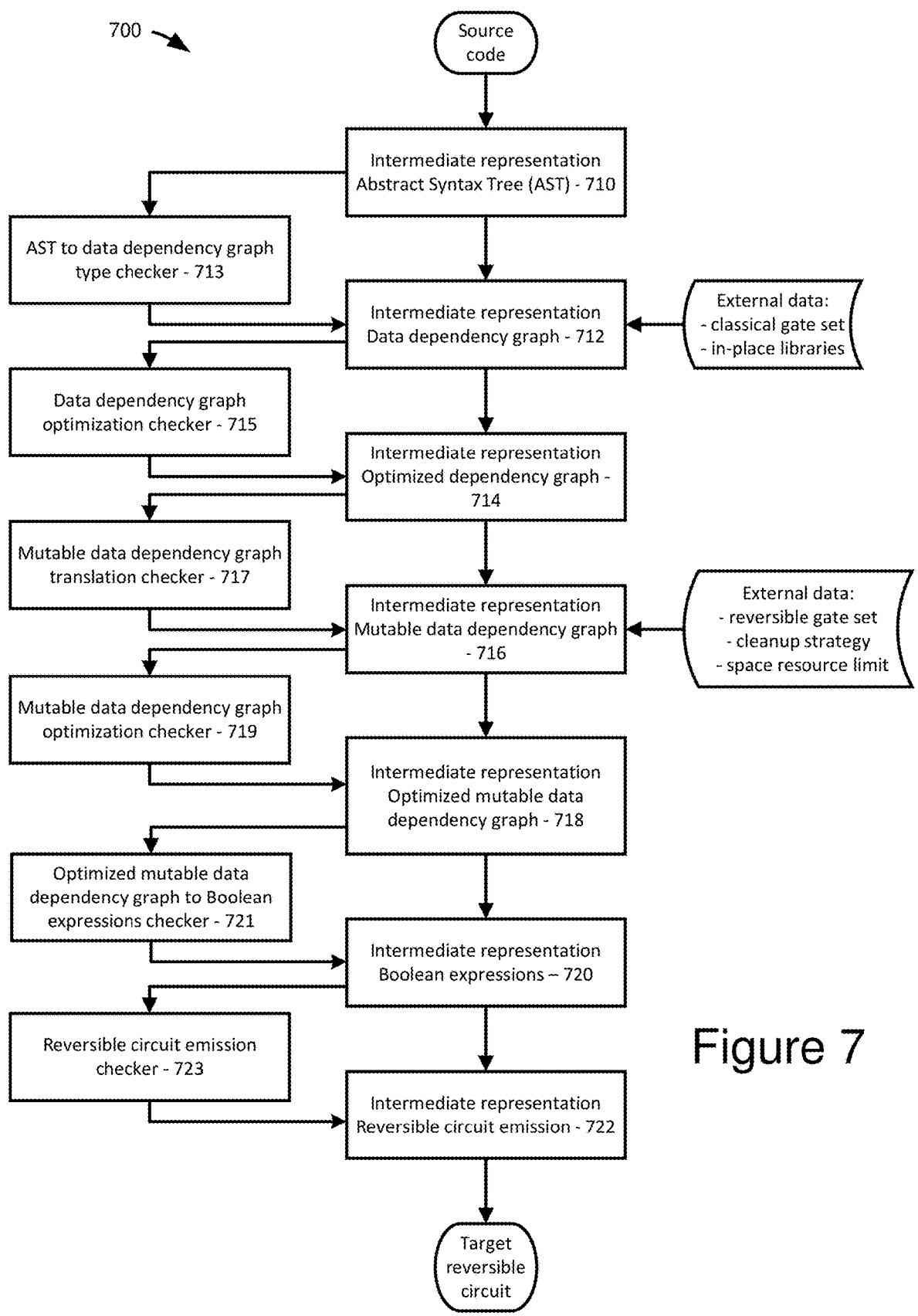
FIG. 7 is a flow chart showing an overall process for an example reversible circuit compilation (synthesis) and verification process in accordance with embodiments of the disclosed technology.

FIG. 7 is a flow chart 700 showing an overall process for an example reversible circuit compilation (synthesis) and verification process in accordance with embodiments of the disclosed technology. In particular, the flow chart 700 shows a series of intermediate representations through which an input source code file (e.g., a high-level description, such as an algorithmic description of desired reversible circuit behavior (according to a F #, F*, or other suitable high-level description)) is transformed into a lower-level (e.g., gate-level) description adapted for use with a reversible circuit, such as a quantum computer (e.g., a description of reversible gate networks (a description in the LIQUi|>, .qc, or other such suitable format)). The size and complexity of the high-level description and the resulting lower-level description can vary. In certain example embodiments, for instance, the process of FIG. 7 (or any of the compilation and verification processes disclosed herein) generates a lower-level description specifying 500 or more, 1000 or more, or 2500 or more reversible gates.

The particular operations or sequence should not be construed as limiting, as they can be performed alone or in any combination or subcombination with one another. Additionally, the illustrated operations can be performed together with one or more other operations. Still further, the identified operations need not be performed by a single software module, but can be implemented using multiple modules or software tools, which collectively perform the illustrated method.

At 710, an abstract syntax tree (AST) is generated from an input source code file. As noted, the source code file can be a high-level description, such as an algorithmic description of desired reversible circuit (e.g., quantum computer) behavior (according to a F #, F*, or other suitable high-level description). The abstract syntax tree can be generated by applying a suitable parser to the input source code file.

At 712, a data dependency graph is generated from the abstract syntax tree. Generation of the data dependency graph can be guided by one or more of a set of classical gates (gate sets for classical non-reversible circuits) and/or in-place libraries.

At 713, the data dependency graph is verified relative to the AST. In the illustrated embodiment, an AST to data dependency graph type checker is used to perform the verification of the intermediate representations. Any of the type checking techniques disclosed herein can be used to perform this verification.

At 714, an optimized data dependency graph is generated from the data dependency graph. For example, optimizations can be performed to remove unused code portions (or branches) of the data dependency graph, to apply known optimized graph representations in place of recognized unoptimized portions, and/or other such optimizations.

At 715, the optimized data dependency graph is verified relative to the data dependency graph. In the illustrated embodiment, a data dependency graph optimization checker is used to perform the verification of the intermediate representations. Any of the verification techniques disclosed herein can be used to perform this verification.

At 716, a mutable data dependency graph is generated from the optimized data dependency graph of 714. In the example embodiment, reversible-computing considerations are introduced into the compilation/synthesis process. For example, at 716, the generation of the mutable data dependency graph can be guided by replacement of classical gate sets with reversible gate sets (e.g., reversible gate sets suited for quantum computers). Additionally, the generation of the mutable data dependency graph can be guided by (or otherwise influenced by) a space constraint of the target reversible circuit (e.g., a total (maximum) number of bits available in the architecture of a target reversible circuit, such as a quantum computer)). Example embodiments for generating such a mutable data dependency graph are described, for example, in A. Parent, M. Roetteler, and K. M. Svore, "Reversible circuit compilation with space constraints", arXiv preprint arXiv: 1510.00377 (2015) and in U.S. Patent Application No. 62/172,727, entitled "REVERSIBLE CIRCUIT COMPILATION WITH SPACE CONSTRAINTS" and filed on Jun. 8, 2015. Still further, the generation of the mutable data dependency graph can include application of any of the clean-up schemes discussed herein or in the cited references, which can reduce the total number of bits used to perform the computation described by the input source code. As also described above, generation of the mutable data dependency graph can include identifying mutable variables that may be re-used during the computation and/or use of in-place operations.

At 717, the mutable data dependency graph is verified relative to the optimized data dependency graph. In the illustrated embodiment, a mutable data dependency graph translation checker is used to perform the verification of the intermediate representations. Any of the verification techniques disclosed herein can be used to perform this verification.

At 718, an optimized mutable data dependency graph is generated from the mutable data dependency graph. For example, optimizations can be performed to remove unused code portions (or branches) of the mutable data dependency graph, to apply known optimized graph representations in place of recognized unoptimized portions (e.g., using functionally equivalent but computationally improved operations in place of unoptimized portions according to one or more optimized templates in an optimized library), and/or other such optimizations. For instance, peephole optimization can be performed at 718. Any of the clean-up schemes and/or in-place-operation techniques discussed in detail above can also be applied at this stage (e.g., instead of or in addition to the initial mutable data dependency graph generation at 716).

At 719, the optimized mutable data dependency graph is verified relative to the mutable data dependency graph. In the illustrated embodiment, a mutable data dependency graph optimization checker is used to perform the verification of the intermediate representations. Any of the verification techniques disclosed herein can be used to perform this verification.

At 720, a Boolean expression representation is generated from the optimized mutable data dependency graph. For example, Boolean expressions as discussed herein can be generated from the optimized mutable data dependency graph.

At 721, the Boolean expression representation is verified relative to the optimized mutable data dependency graph. In the illustrated embodiment, an optimized mutable data dependency graph to Boolean expressions checker is used to perform the verification of the intermediate representations. Any of the verification techniques disclosed herein can be used to perform this verification.

At 722, a reversible circuit (e.g., a quantum computer circuit description) is emitted from the Boolean expressions (or, in some cases, from the optimized mutable data dependency graph). This process can involve an initial or further: mapping of the Boolean expressions (or of the optimized mutable data dependency graph) to reversible gate sets, allocation of bits from the available bits of the target reversible circuit (e.g., the available bits of the target quantum computer), and/or optimization. The reversible circuit can be a reversible circuit description stored in a variety of suitable gate-level formats specially adapted for reversible circuit architectures (e.g., LIQUi|>, .qc, or other such format). For example, the reversible circuit description can specify the one or more reversible gates as one or more of a sequence of Toffoli gates, Fredkin gates, Kerntopf gates, multiply controlled gates, CNOT gates, NOT gates, and/or other such reversible-circuit-specific gate networks.

At 723, the Boolean expressions representation is verified relative to the reversible circuit. In the illustrated embodiment, a reversible circuit emission checker is used to perform the verification of the intermediate representations. Any of the verification techniques disclosed herein can be used to perform this verification.

The reversible circuit description output at 722 can then be used as the target reversible circuit to implement the one or more reversible gates specified by the reversible circuit description in a physical embodiment of a reversible circuit architecture (e.g., a quantum computer). In some example embodiments, the reversible circuit description output at 722 is used as the target reversible circuit if (e.g., only if) the various verification processes 713, 715, 717, 719, 721, 723 were able to confirm that the intermediate representations generated during compilation satisfied the desired verification criteria (e.g., that the respective lower-level intermediate representation produced the same output as the respective higher-level intermediate representation and/or that the respective lower-level intermediate representation returned all ancillas to their initial state). If any of the verification processes reveal problems (e.g., if a verification process fails and, for instance, identifies one or more counterexamples that show instances when the desired reversible circuit operation will not occur), then the compiler may produce reversible circuits that will ultimately be inoperable in operation. Accordingly, the compiler can be modified to address its flaws (e.g., with guidance provided from the verification results).

Figure 15:
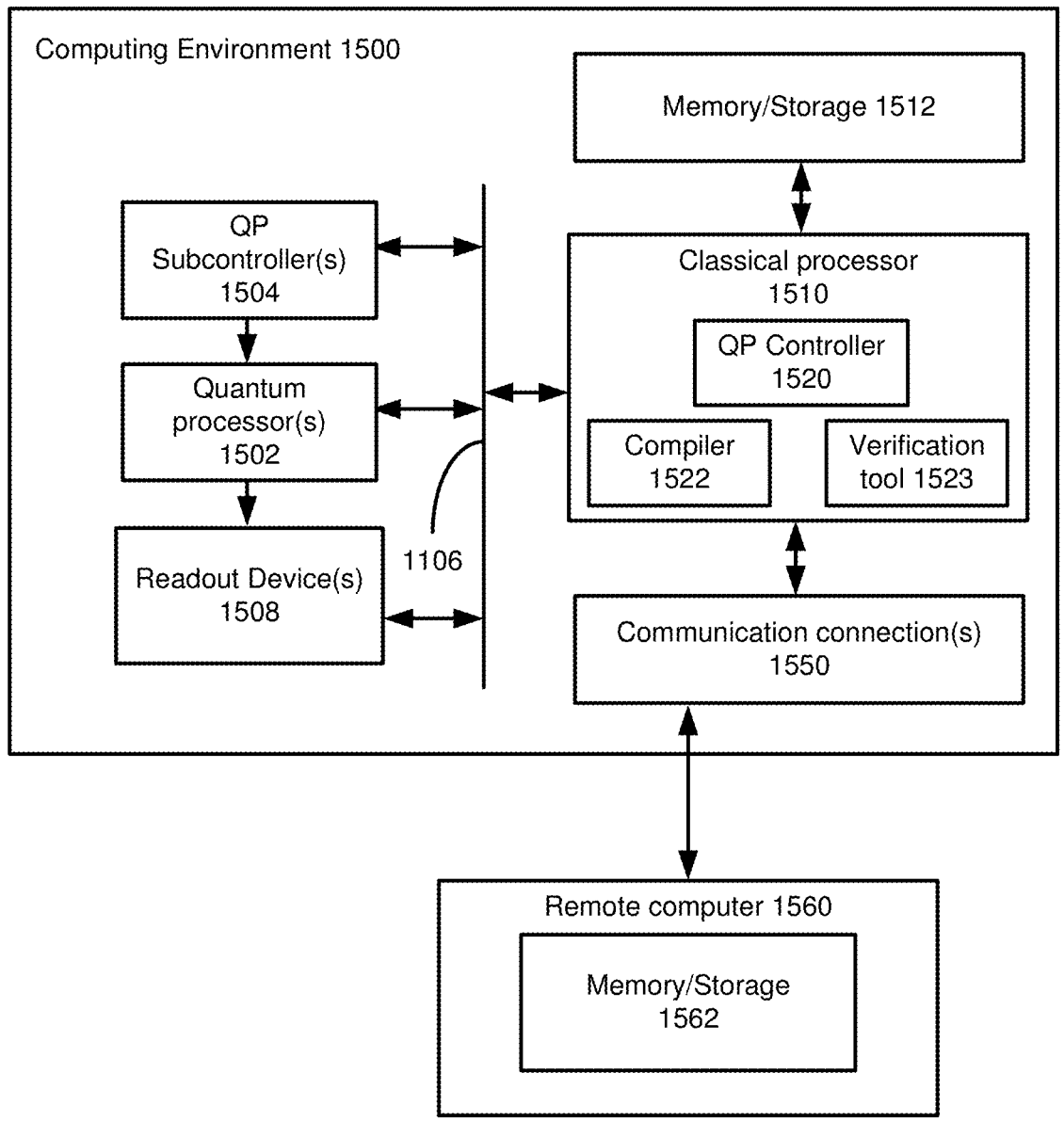
FIG. 15 shows an example quantum computing system in which aspects of the disclosed technology can be implemented.

The reversible circuit architecture in which the reversible circuit description output at 722 is used can be any of a variety of reversible circuit architectures, including quantum computers. Such a quantum computing device can be configured to operate according to one of a variety of quantum computing principles. For instance, the quantum computer can be one or more of: (a) a superconducting quantum computer in which the qubits are stored in the energy levels of a superconductor and in which qubits are manipulated by applying external electromagnetic fields, thereby allowing implementation of the quantum computer circuit description by a universal gate set implemented by the superconducting quantum computer system; (b) an ion trap quantum computer in which the qubits are stored in the internal energy levels of trapped ions and in which qubits are manipulated by applying laser pulses, thereby allowing implementation of the quantum computer circuit description by a universal gate set implemented by the ion trap quantum computer system; or (c) a fault-tolerant architecture for quantum computing in which qubits are encoded using quantum error-correcting codes, or using a hierarchy of quantum error-correcting codes, and in which qubits are manipulated by means of encoded operations, thereby allowing implementation of the quantum computer circuit description as encoded operations over a universal fault-tolerant gate set. An example arrangement for controlling a quantum computer using the compiled/synthesized quantum circuit description is shown in FIG. 15. It should be noted that, in some cases, some additional processing is performed to prepare the quantum circuit description for use with the quantum computer (e.g., translation into the magnetic fields, pulses, encoded operations, or other such control signals adapted for the particular target quantum circuit).

The particular flow in FIG. 7 shows a somewhat idealized process whereby verification occurs during each compilation step and in which a mutable dependency graph is used during the compilation process (e.g., as in A. Parent, M. Roetteler, and K. M. Svore, "Reversible circuit compilation with space constraints", arXiv preprint arXiv:1510.00377 (2015) or in U.S. Patent Application No. 62/172,727, entitled "REVERSIBLE CIRCUIT COMPILATION WITH SPACE CONSTRAINTS" and filed on Jun. 8, 2015). Any of the individual verification and/or compilation acts shown in FIG. 7 can be modified, skipped, or replaced.

Figure 8A:
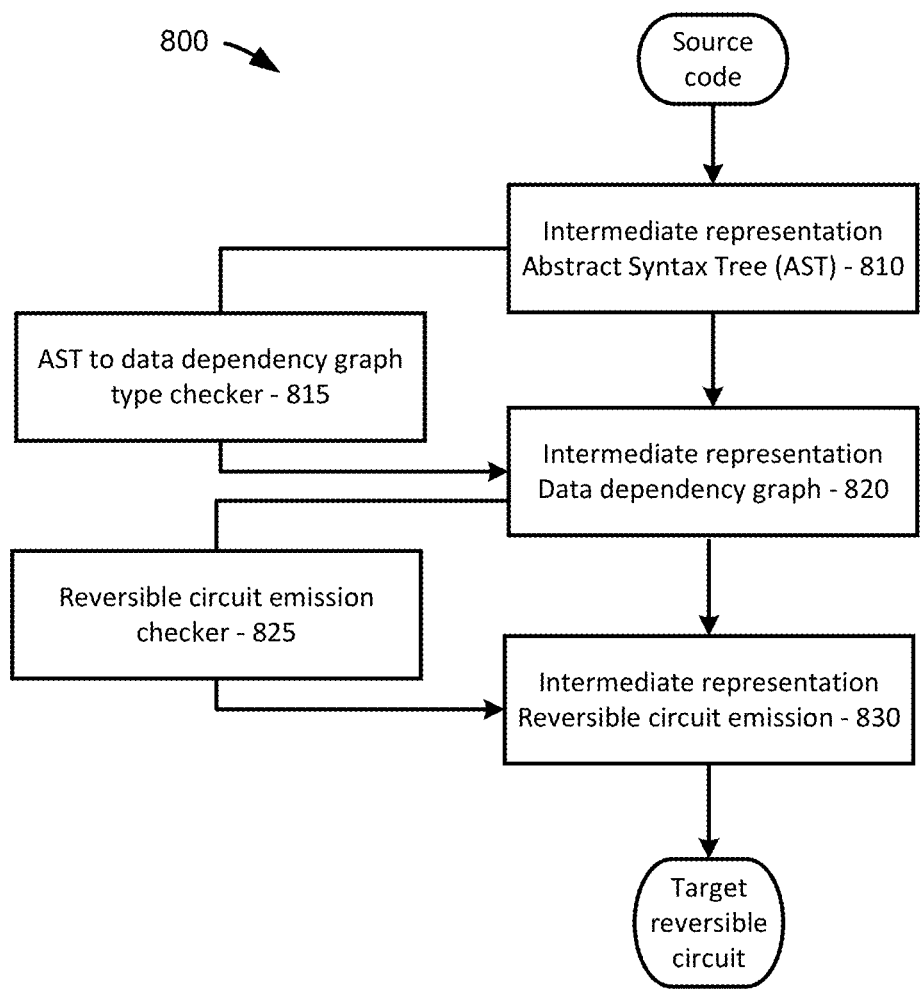
FIGS. 8A and 8B are flow charts showing further example reversible circuit compilation (synthesis) and verification processes in accordance with embodiments of the disclosed technology.
Figure 8B:
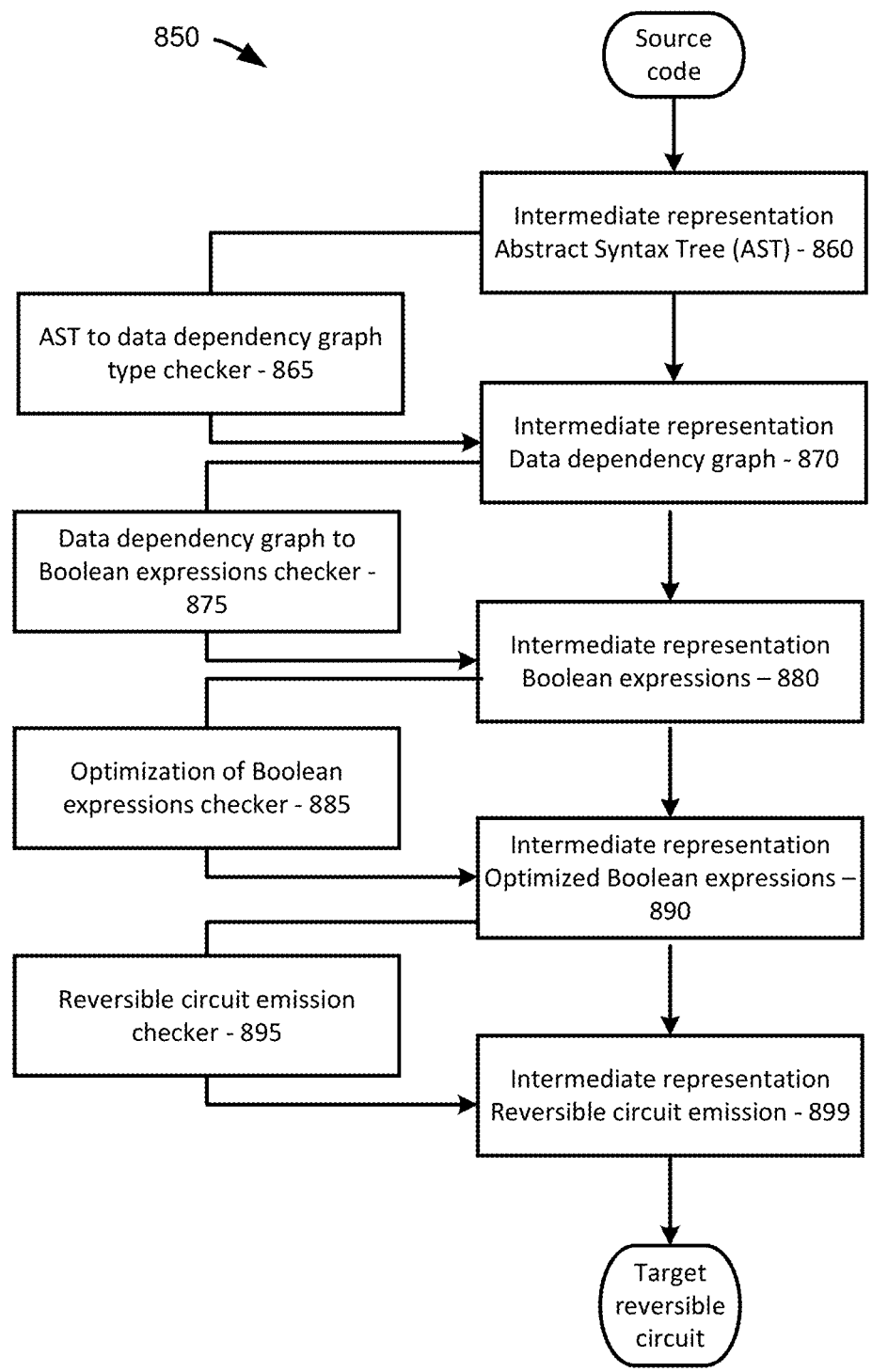

FIGS. 8A and 8B are flow charts 800, 850 showing two example embodiments of an overall process for an example reversible circuit compilation (synthesis) and verification process in accordance with embodiments of the disclosed technology. More specifically, the flow chart 800 shows the compilation flow for the "default" mode (which performs the basic Bennett strategy for assigning ancillas) implemented in the example REVER compiler discussed above, whereas flow chart 850 shows the compilation flow for the "space-efficient" mode implemented in the example REVER compiler. As with FIG. 7, the flow charts 800, 850 show a series of intermediate representations through which an input source code file (e.g., a high-level description, such as an algorithmic description of desired reversible circuit behavior (according to a F #, F*, or other suitable high-level description)) is transformed into a lower-level (e.g., gate-level) description adapted for use with a reversible circuit, such as a quantum computer (e.g., a description of reversible gate networks (a description in the LIQUi|>, .qc, or other such suitable format)). The size and complexity of the high-level description and the resulting lower-level description can vary. In certain example embodiments, for instance, the flows 800, 850 of FIGS. 8A and 8B (or any of the compilation and verification processes disclosed herein) generate a lower-level description specifying 500 or more, 1000 or more, or 2500 or more reversible gates.

Turning first to flow chart 800, at 810, a given source program is translated into an abstract syntax tree, which is then translated into an internal representation as a dependency graph 820. At 815, this translation is checked to be correct using mathematical proofs about the compiler's transformation rules. At 830, the dependency graph is directly translated into a sequence of reversible gates that comprise a reversible circuit using Bennett's basic compute-copy-uncompute method. At 825, the compiler transformation rules for this transformation are checked to be correct using mathematical proofs. Any one or more of the verification techniques described herein can be used during the verification acts at 815 and 825.

Turning next to flow chart 850, which shows an example compilation process for the space-efficient mode implemented in REVER, at 860, a given source program is translated into an abstract syntax tree, and, at 870, the abstract syntax tree is translated into an internal representation as a dependency graph. At 865, this translation is checked to be correct using mathematical proofs about the compiler's transformation rules. At 880, the dependency graph is translated into an internal representation as Boolean expressions. At 875, this translation is checked to be correct using mathematical proofs about the compiler's transformation rules. At 890, optimization rules are applied that take the Boolean expressions and simplify them. At 885, these compiler transformation rules are checked to be correct using mathematical proofs. At 899, the example compiler rewrites the optimized Boolean expressions into a sequence of reversible gates that comprise a reversible circuit, which is then emitted (output). At 895, these compiler transformation rules are proved to be correct using mathematical proofs. Any one or more of the verification techniques described herein can be used during the verification acts at 865, 875, 885, and 895.

Figure 9:
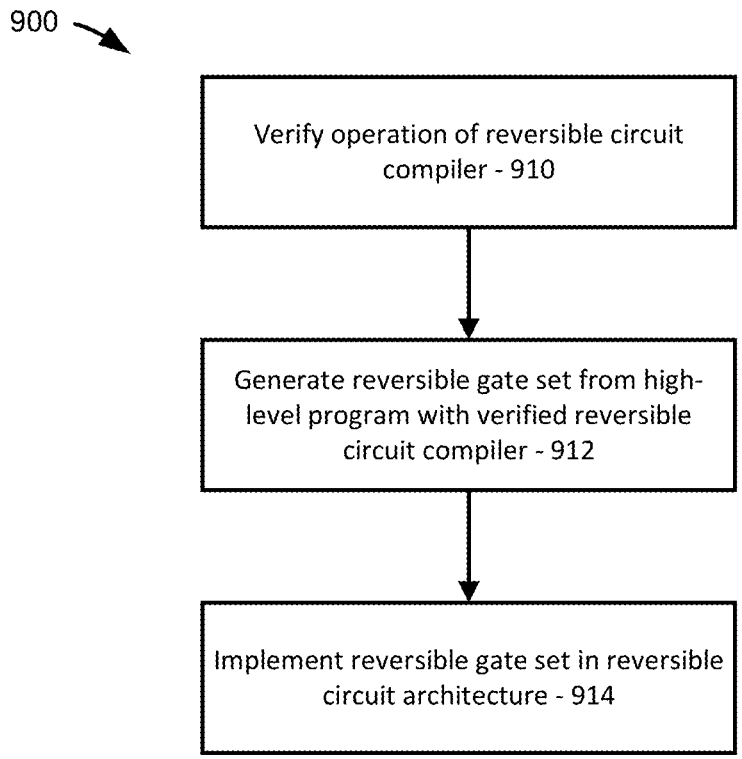
FIG. 9 is a flow chart showing another example reversible circuit compilation (synthesis) and verification process in accordance with embodiments of the disclosed technology.

FIG. 9 is a flow chart 900 showing a verification and compilation process for an example reversible circuit compiler in accordance with embodiments of the disclosed technology. The process can be used to help verify the compilation (synthesis) process performed by a reversible circuit compiler by which an input source code file (e.g., a high-level description, such as an algorithmic description of desired reversible circuit behavior (according to a F # or other suitable high-level description)) is transformed into a lower-level (e.g., gate-level) description adapted for use with a reversible circuit, such as a quantum computer (e.g., a description of reversible gate networks (a description in the LIQUi|>, .qc, or other such suitable format). The size and complexity of the high-level description and the resulting lower-level description can vary. In certain example embodiments, for instance, the compiler generates a lower-level description specifying 500 or more, 1000 or more, or 2500 or more reversible gates.

The particular operations or sequence should not be construed as limiting, as they can be performed alone or in any combination or subcombination with one another. Additionally, the illustrated operations can be performed together with one or more other operations. Still further, the identified operations need not be performed by a single software module, but can be implemented using multiple modules or software tools, which collectively perform the illustrated method.

At 910, operation of the reversible circuit compiler is verified. As noted, the reversible circuit compiler of this embodiment is configured to generate a reversible circuit from a high-level program description of the reversible circuit. The high-level program can be, for example, an algorithmic description of the reversible circuit describing the behavior of the reversible circuit. In the illustrated embodiment, the act of verifying comprises verifying that an intermediate representation of the reversible circuit that is generated by the reversible circuit compiler satisfies one or more verification criteria relative to a higher-level intermediate representation of the reversible circuit that is also generated by the reversible circuit compiler. The one or more criteria can include one or more of: (a) ensuring that the intermediate representation of the reversible circuit implements the same function as the higher-level intermediate representation; and/or (b) ensuring that all ancilla bits that are allocated by the intermediate representation of the reversible circuit are returned clean.

In particular implementations, the act of verifying further comprises type-checking the intermediate representation relative to the higher-level intermediate representation. For instance, and as explained above, the type-checking can comprise allowing only operations or transformations that do not violate the rules of a type system, where the type system is specified by a set of type inference rules. The type-checking thus ensures application of functions to inputs of appropriate types.

In some implementations, the act of verifying further comprises performing one or more semantic checks of the intermediate representation relative to the higher-level intermediate representation. For example, and as discussed in detail above, the semantic checks can be performed by a proof system that asserts the correctness of one or more transformations of the compiler as the compiler generates the reversible circuit from the high-level program. In some implementations, the reversible circuit compiler is verified by proofs that are coded into source code for the reversible circuit compiler. For example, the compiler can be written in a functional programming language (e.g., F*) having a type system that allows for one to check functional correctness by using proofs written in the same language and as part of the same source code.

At 912, a reversible gate set is generated by the reversible circuit compiler from the high-level program.

At 914, the reversible gate set is implemented in a physical embodiment of a reversible circuit architecture (e.g., a quantum computer). The reversible circuit architecture can be any of a variety of reversible circuit architectures, including quantum computers. Such a quantum computing device can be configured to operate according to one of a variety of quantum computing principles. For instance, the quantum computer can be one or more of: (a) a superconducting quantum computer in which the qubits are stored in the energy levels of a superconductor and in which qubits are manipulated by applying external electromagnetic fields, thereby allowing implementation of the quantum computer circuit description by a universal gate set implemented by the superconducting quantum computer system; (b) an ion trap quantum computer in which the qubits are stored in the internal energy levels of trapped ions and in which qubits are manipulated by applying laser pulses, thereby allowing implementation of the quantum computer circuit description by a universal gate set implemented by the ion trap quantum computer system; or (c) a fault-tolerant architecture for quantum computing in which qubits are encoded using quantum error-correcting codes, or using a hierarchy of quantum error-correcting codes, and in which qubits are manipulated by means of encoded operations, thereby allowing implementation of the quantum computer circuit description as encoded operations over a universal fault-tolerant gate set. An example arrangement for controlling a quantum computer using the compiled/synthesized quantum circuit description is shown in FIG. 15. It should be noted that, in some cases, some additional processing is performed to prepare the quantum circuit description for use with the quantum computer (e.g., translation into the magnetic fields, pulses, encoded operations, or other such control signals adapted for the particular target quantum circuit).

Figure 10:
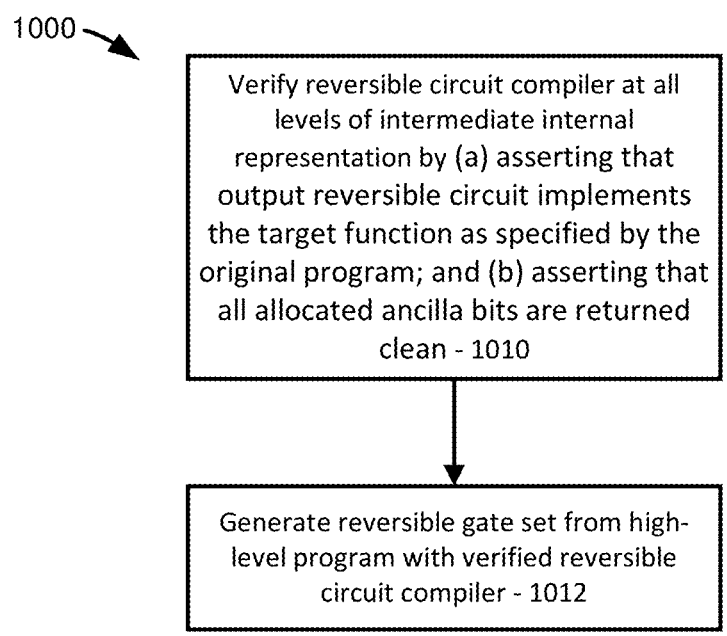
FIG. 10 is a flow chart showing another example reversible circuit compilation (synthesis) and verification process in accordance with embodiments of the disclosed technology.

FIG. 10 is a flow chart 1000 showing another verification and compilation process for an example reversible circuit compiler in accordance with embodiments of the disclosed technology. As with FIG. 8, the process can be used to help verify the compilation (synthesis) process performed by a reversible circuit compiler by which an input source code file (e.g., a high-level description, such as an algorithmic description of desired reversible circuit behavior (according to a F # or other suitable high-level description)) is transformed into a lower-level (e.g., gate-level) description adapted for use with a reversible circuit, such as a quantum computer (e.g., a description of reversible gate networks (a description in the LIQUi|>, .qc, or other such suitable format)). The size and complexity of the high-level description and the resulting lower-level description can vary. In certain example embodiments, for instance, the compiler generates a lower-level description specifying 500 or more, 1000 or more, or 2500 or more reversible gates.

The particular operations or sequence should not be construed as limiting, as they can be performed alone or in any combination or subcombination with one another. Additionally, the illustrated operations can be performed together with one or more other operations. Still further the identified operations need not be performed by a single software module, but can be implemented using multiple modules or software tools, which collectively perform the illustrated method.

At 1010, a reversible circuit compiler that generates an output reversible circuit from a high-level program is verified at all levels of intermediate internal representation. In the illustrated embodiment, this verification is performed by: (a) asserting that an output reversible circuit implements the target function as specified by the original program; and (b) asserting that all ancilla bits that are allocated by the output reversible circuit implementation are returned clean.

At 1012, an output reversible circuit is generated from a high-level program by the reversible circuit compiler. In this case, the reversible circuit compiler is verified at all levels of intermediate internal representations. In particular implementations, the generating comprises translating the high-level program into a Toffoli network upon successful verification and type-checking of the reversible circuit compiler, the Toffoli network comprising at least one of a Toffoli gate, NOT gate, or CNOT gate. For instance, and as explained above, the type-checking can comprise allowing only operations or transformations that do not violate the rules of a type system, where the type system is specified by a set of type inference rules. The type-checking thus ensures application of functions to inputs of appropriate types. In some implementations, the verifying is performed at least in part by applying semantic checks performed by a proof system to assert the correctness of the transformations of the compiler. Further, in some implementations, the reversible circuit compiler is verified by proofs that are coded into source code for the reversible circuit compiler (e.g., in F*).

The reversible circuit description generated can be used to implement the one or more reversible gates specified by the reversible circuit description in a physical embodiment of a reversible circuit architecture, such as a quantum computer. Such a quantum computer can be a quantum computing device configured to operate according to one of a variety of quantum computing principles. For instance, and as more fully described above with respect to FIG. 7, the quantum computer can be one or more of: (a) a superconducting quantum computer; (b) an ion trap quantum computer; or (c) a fault-tolerant architecture for quantum computing. An example arrangement for controlling a quantum computer using the compiled/synthesized quantum circuit description is shown in FIG. 15. It should be noted that, in some cases, some additional processing is performed to prepare the quantum circuit description for use with the quantum computer (e.g., translation into the magnetic fields, pulses, encoded operations, or other such control signals adapted for the particular target quantum circuit).

Figure 11:
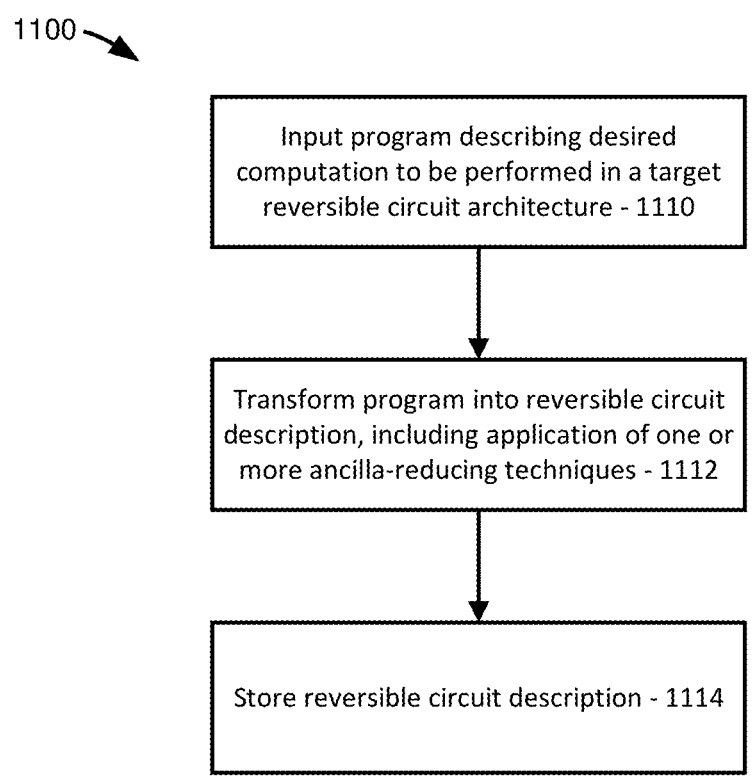
FIG. 11 is a flow chart showing another example reversible circuit compilation (synthesis) and verification process in accordance with embodiments of the disclosed technology.

FIG. 11 is a flow chart 1100 showing a compilation process for an example reversible circuit compiler in accordance with embodiments of the disclosed technology. The process can be performed by a reversible circuit compiler by which an input source code file (e.g., a high-level description, such as an algorithmic description of desired reversible circuit behavior (according to a F # or other suitable high-level description)) is transformed into a lower-level (e.g., gate-level) description adapted for use with a reversible circuit, such as a quantum computer (e.g., a description of reversible gate networks (a description in the LIQUi|>, .qc, or other such suitable format)). The size and complexity of the high-level description and the resulting lower-level description can vary. In certain example embodiments, for instance, the compiler generates a lower-level description specifying 500 or more, 1000 or more, or 2500 or more reversible gates. The particular operations or sequence should not be construed as limiting, as they can be performed alone or in any combination or subcombination with one another. Additionally, the illustrated operations can be performed together with one or more other operations. Still further, the identified operations need not be performed by a single software module, but can be implemented using multiple modules or software tools, which collectively perform the illustrated method.

At 1110, a program describing a desired computation to be performed in a target reversible circuit architecture using bits is input (e.g., loaded into memory or otherwise prepared for further processing).

At 1112, the program is transformed into a reversible circuit description specifying one or more reversible gates that use the bits to achieve the desired computation. In the illustrated embodiment, the reversible circuit compiler is further configured to, as part of the transformation of the program into the reversible circuit description, apply one or more ancilla-reducing techniques to reduce the number of ancillas used by the reversible circuit description. The ancilla-reducing techniques can comprise, for example any of the techniques described above. For example, the ancilla-reducing technique can comprise identifying an operation in the program that can be implemented as an exclusive-or operation of a target bit, and generating a reversible circuit with a reversible ancilla bit to implement the operation. The ancilla-reducing techniques can also (or alternatively) comprise rewriting AND operations from the program into a positive-polarity exclusive-sum-of-products form. The ancilla-reducing techniques can also (or alternatively) short circuiting one or more AND and/or XOR operations. For example, one or more AND and/or XOR operations can be simplified by factoring the AND/OR expressions to reduce their depth. Still further, reversible circuit compiler can be further configured to, as part of the transformation of the program into the reversible circuit description, reduce sub-expressions in the program to Boolean expressions and apply the ancilla-reducing techniques to the Boolean expressions.

At 1114, the reversible circuit description is stored (e.g., stored in memory or other volatile or nonvolatile storage device).

The reversible circuit description generated can be used to implement the one or more reversible gates specified by the reversible circuit description in a physical embodiment of a reversible circuit architecture, such as a quantum computer. Such a quantum computer can be a quantum computing device configured to operate according to one of a variety of quantum computing principles. For instance, and as more fully described above with respect to FIG. 7, the quantum computer can be one or more of: (a) a superconducting quantum computer; (b) an ion trap quantum computer; or (c) a fault-tolerant architecture for quantum computing. An example arrangement for controlling a quantum computer using the compiled/synthesized quantum circuit description is shown in FIG. 15. It should be noted that, in some cases, some additional processing is performed to prepare the quantum circuit description for use with the quantum computer (e.g., translation into the magnetic fields, pulses, encoded operations, or other such control signals adapted for the particular target quantum circuit).

10. Example Computing Environments

FIG. 11 illustrates a generalized example of a suitable computing environment 1100 in which several of the described embodiments can be implemented. The computing environment 1100 is not intended to suggest any limitation as to the scope of use or functionality of the disclosed technology, as the techniques and tools described herein can be implemented in diverse general-purpose or special-purpose environments that have computing hardware.

With reference to FIG. 11, the computing environment 1100 includes at least one processing device 1110 and memory 1120. In FIG. 11, this most basic configuration 1130 is included within a dashed line. The processing device 1110 (e.g., a CPU or microprocessor) executes computer-executable instructions. In a multi-processing system, multiple processing devices execute computer-executable instructions to increase processing power. The memory 1120 may be volatile memory (e.g., registers, cache, RAM, DRAM, SRAM), non-volatile memory (e.g., ROM, EEPROM, flash memory), or some combination of the two. The memory 1120 stores software 1180 implementing one or more of the described reversible circuit compilation or synthesis tools and/or techniques described herein. For example, the memory 1120 can store software 1180 for implementing any of the disclosed techniques described herein and their accompanying user interfaces.

The computing environment can have additional features. For example, the computing environment 1100 includes storage 1140, one or more input devices 1150, one or more output devices 1160, and one or more communication connections 1170. An interconnection mechanism (not shown), such as a bus, controller, or network, interconnects the components of the computing environment 1100. Typically, operating system software (not shown) provides an operating environment for other software executing in the computing environment 1100, and coordinates activities of the components of the computing environment 1100.

The storage 1140 can be removable or non-removable, and includes one or more magnetic disks (e.g., hard drives), solid state drives (e.g., flash drives), magnetic tapes or cassettes. CD-ROMs, DVDs, or any other tangible non-volatile storage medium which can be used to store information and which can be accessed within the computing environment 1100. The storage 1140 can also store instructions for the software 1180 implementing any of the described techniques, systems, or environments.

The input device(s) 1150 can be a touch input device such as a keyboard, touchscreen, mouse, pen, trackball, a voice input device, a scanning device, or another device that provides input to the computing environment 1100. The output device(s) 1160 can be a display device (e.g., a computer monitor, laptop display, smartphone display, tablet display, netbook display, or touchscreen), printer, speaker, or another device that provides output from the computing environment 1100.

The communication connection(s) 1170 enable communication over a communication medium to another computing entity. The communication medium conveys information such as computer-executable instructions or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

As noted, the various methods can be described in the general context of computer-readable instructions stored on one or more computer-readable media. Computer-readable media are any available media (e.g., memory or storage device) that can be accessed within or by a computing environment. Computer-readable media include tangible computer-readable memory or storage devices, such as memory 1120 and/or storage 1140, and do not include propagating carrier waves or signals per se (tangible computer-readable memory or storage devices do not include propagating carrier waves or signals per se).

The various methods disclosed herein can also be described in the general context of computer-executable instructions (such as those included in program modules) being executed in a computing environment by a processor. Generally, program modules include routines, programs, libraries, objects, classes, components, data structures, and so on, that perform particular tasks or implement particular abstract data types. The functionality of the program modules may be combined or split between program modules as desired in various embodiments. Computer-executable instructions for program modules may be executed within a local or distributed computing environment.

Figure 12:
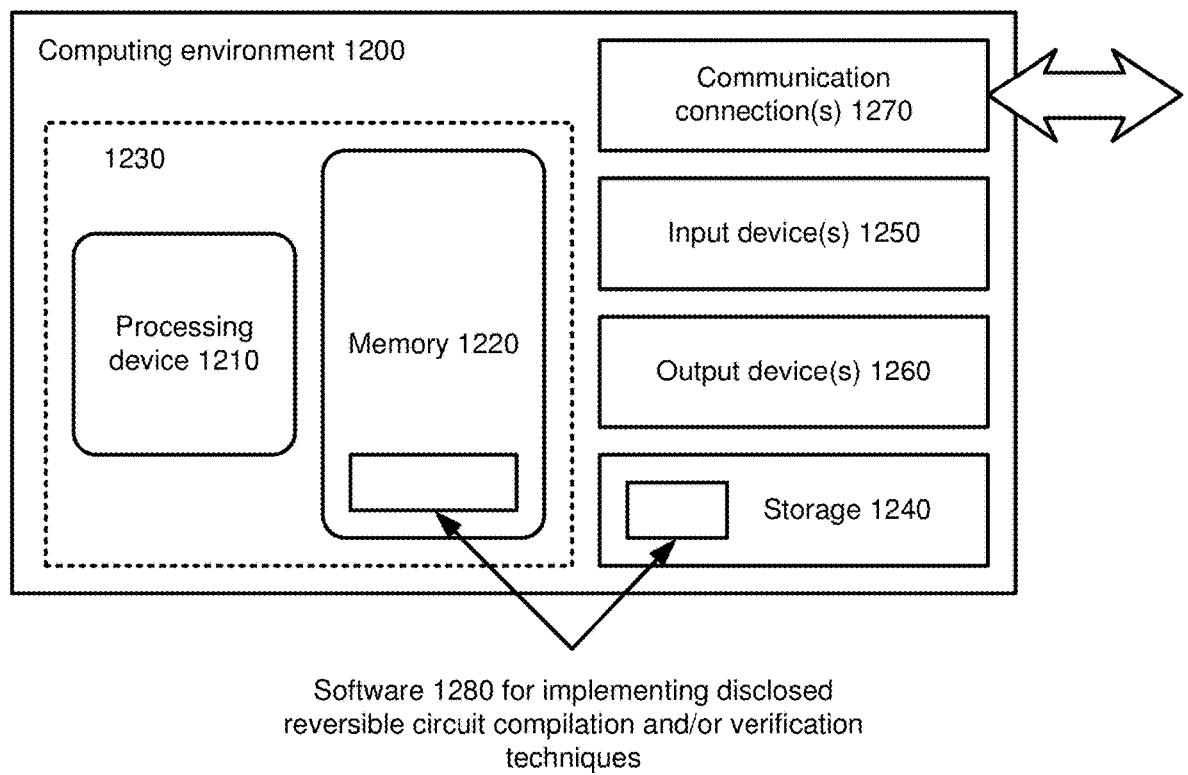
FIG. 12 illustrates a generalized example of a suitable computing environment in which several of the described embodiments can be implemented.

An example of a possible network topology 1200 (e.g., a client-server network) for implementing a system according to the disclosed technology is depicted in FIG. 12. Networked computing device 1220 can be, for example, a computer running a browser or other software connected to a network 1212. The computing device 1220 can have a computer architecture as shown in FIG. 11 and discussed above. The computing device 1220 is not limited to a traditional personal computer but can comprise other computing hardware configured to connect to and communicate with a network 1212 (e.g., smart phones, laptop computers, tablet computers, or other mobile computing devices, servers, network devices, dedicated devices, and the like). In the illustrated embodiment, the computing device 1220 is configured to communicate with a computing device 1230 (e.g., a remote server, such as a server in a cloud computing environment) via a network 1212. In the illustrated embodiment, the computing device 1220 is configured to transmit input data to the computing device 1230, and the computing device 1230 is configured to implement any of the disclosed compilation and/or verification methods and output results to the computing device 1220. Any of the data received from the computing device 1230 can be stored or displayed on the computing device 1220 (e.g., displayed as data on a graphical user interface or web page at the computing devices 1220). In the illustrated embodiment, the illustrated network 1212 can be implemented as a Local Area Network (LAN) using wired networking (e.g., the Ethernet IEEE standard 802.3 or other appropriate standard) or wireless networking (e.g. one of the IEEE standards 802.11a, 802.11b, 802.11g, or 802.11n or other appropriate standard). Alternatively, at least part of the network 1212 can be the Internet or a similar public network and operate using an appropriate protocol (e.g., the HTTP protocol).

Figure 13:
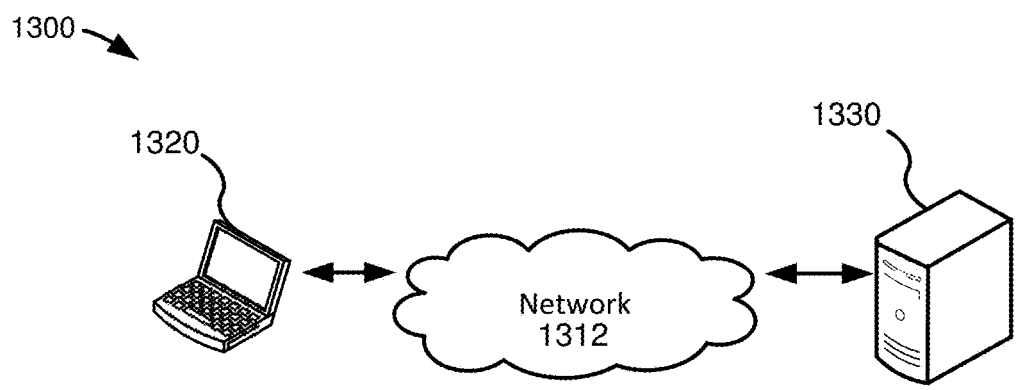
FIGS. 13 and 14 show two example network topologies with which aspects of the disclosed technology can be performed.

Another example of a possible network topology 1300 (e.g., a distributed computing environment) for implementing a system according to the disclosed technology is depicted in FIG. 13. Networked computing device 1320 can be, for example, a computer running a browser or other software connected to a network 1312. The computing device 1320 can have a computer architecture as shown in FIG. 11 and discussed above. In the illustrated embodiment, the computing device 1320 is configured to communicate with multiple computing devices 1330, 1331, 1332 (e.g., remote servers or other distributed computing devices, such as one or more servers in a cloud computing environment) via the network 1312. In the illustrated embodiment, each of the computing devices 1330, 1331, 1332 in the computing environment 1300 is used to perform at least a portion of the compilation and/or verification process. In other words, the computing devices 1330, 1331, 1332 form a distributed computing environment in which the compilation/verification process is shared across multiple computing devices. The computing device 1320 is configured to transmit input data to the computing devices 1330, 1331, 1332, which are configured to distributively implement a compilation/verification process, including performance of any of the disclosed methods, and to provide results to the computing device 1320. Any of the data received from the computing devices 1330, 1331, 1332 can be stored or displayed on the computing device 1320 (e.g., displayed as data on a graphical user interface or web page at the computing devices 1320). The illustrated network 1312 can be any of the networks discussed above with respect to FIG. 9.

Figure 14:
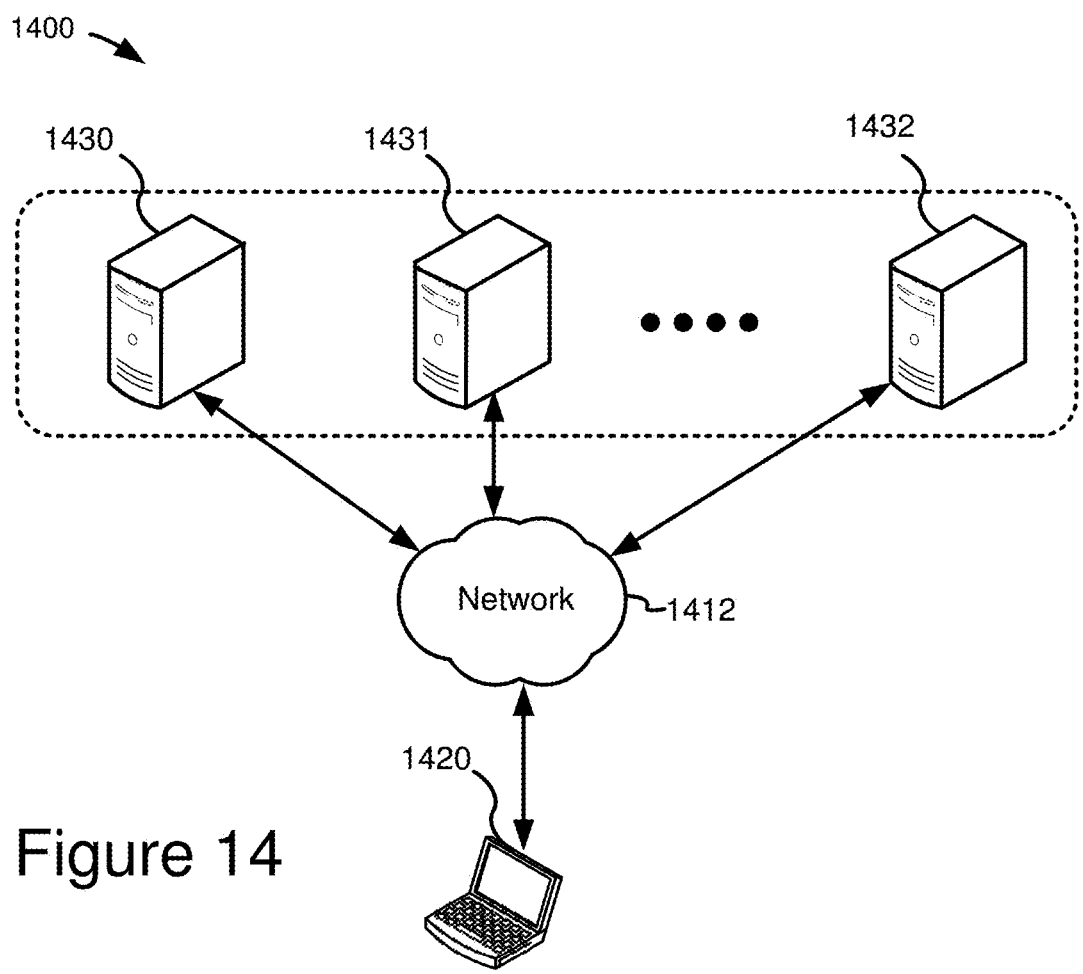

With reference to FIG. 14, an exemplary system for implementing the disclosed technology includes computing environment 1400. In computing environment 1400, a compiled quantum computer circuit description from a compiler verified using any of the disclosed techniques can be used to program (or configure) one or more quantum processing units such that the quantum processing unit(s) implement the sequence of reversible gates described by the quantum computer circuit description. The quantum computer circuit description can be generated from any of the disclosed embodiments and can include the sequence of gates that reverse or reset ancilla qubit states, and thus enable the efficient re-use of qubits according to any of the space-spacing techniques disclosed herein. Further, the quantum computer circuit description can be verified using any of the disclosed verification techniques in order to ensure that it operates as desired (e.g., that the compiled quantum computer circuit description produces the same output as the high-level source code from which it was generated, and that the compiled quantum computer circuit description returns all ancillas to their initial state).

The environment 1400 includes one or more quantum processing units 1402 and one or more readout device(s) 1408. The quantum processing unit(s) execute quantum circuits that are precompiled and described by the quantum computer circuit description. The quantum processing unit(s) can be one or more of, but are not limited to: (a) a superconducting quantum computer; (b) an ion trap quantum computer: or (c) a fault-tolerant architecture for quantum computing. The precompiled quantum circuits, such as any of the disclosed networks of reversible gates or other procedures, can be sent into (or otherwise applied to) the quantum processing unit(s) via control lines 1406 at the control of quantum processor controller 1420. The quantum processor controller (QP controller) 1420 can operate in conjunction with a classical processor 1410 to implement the desired quantum computing process. In the illustrated example, the QP controller 1420 further implements the desired quantum computing process via one or more QP subcontrollers 1404 that are specially adapted to control a corresponding one of the quantum processor(s) 1402. For instance, in one example, the quantum controller 1420 facilitates implementation of the compiled quantum circuit by sending instructions to one or more memories (e.g., lower-temperature memories), which then pass the instructions to low-temperature control unit(s) (e.g., QP subcontroller(s) 1404) that transmit, for instance, pulse sequences representing the gates to the quantum processing unit(s) 1402 for implementation. In other examples, the QP controller(s) 1420 and QP subcontroller(s) 1404 operate to provide appropriate magnetic fields, encoded operations, or other such control signals to the quantum processor(s) to implement the operations of the compiled quantum computer circuit description. The quantum controller(s) can further interact with readout devices 1408 to help control and implement the desired quantum computing process (e.g., by reading or measuring out data results from the quantum processing units once available, etc.)

With reference to FIG. 14, and as discussed herein, compilation is the process of translating a high-level description of a quantum algorithm into a quantum circuit comprising a sequence of quantum operations or gates. The compilation can be performed by a compiler 1422 using a classical processor 1410 of the environment 1400 which loads the high-level description from memory or storage devices 1412 and stores the resulting quantum computer circuit description in the memory or storage devices 1412.

Further, the compiler 1422 and/or the compilation of any particular high-level description into a quantum computer description can be verified using a verification tool 1423 implementing any of the disclosed verification techniques. In some cases, the verification tool 1423 will be implemented as a separate software tool, while in other cases, it may be integrated with the compiler itself.

In other embodiments, compilation and/or verification can be performed remotely by a remote computer 1400 (e.g., a computer having a computing environment as described above with respect to FIG. 1100) which stores the resulting quantum computer circuit description in one or more memory or storage devices 1462 and transmits the quantum computer circuit description to the computing environment 1400 for implementation in the quantum processing unit(s) 1402. Still further, the remote computer 1400 can store the high-level description in the memory or storage devices 1462 and transmit the high-level description to the computing environment 1400 for compilation and use with the quantum processor(s). In any of these scenarios, results from the computation performed by the quantum processor(s) can be communicated to the remote computer after and/or during the computation process. Still further, the remote computer can communicate with the QP controller(s) 1420 such that the quantum computing process (including any compilation, verification, and QP processor control procedures) can be remotely controlled by the remote computer 1460. In general, the remote computer 1460 communicates with the QP controller(s) 1420, compiler 1422, and/or verification tool 1423 via communication connections 1450. In particular embodiments, the environment 1400 can be a cloud computing environment, which provides the quantum processing resources of the environment 1400 to one or more remote computers (such as remote computer 1460) over a suitable network (which can include the internet).

11. Proof Listings

In this section, the example F* source code listings are given for the theorems and proofs discussed in Section 7. As auxiliary definitions and theorems are not included, the code is included for reference against the less formal mathematical statements given in the main text.

```
(* Theorem 1 *)
val compile_bexp_correct : ah:AncHeap -> targ:int -> exp:BExp -> st:state ->
  Lemma (requires (zeroHeap st ah / \ disjoint (elts ah) (vars exp) / \
         not (Until.mem targ (elts ah)) / \
         not (Util.mem targ (vars exp))))
    (ensures (compileBExpEval ah targ exp st = st tavg <>evalBExp exp st))
    (decreases %[exp;0])
val compile_bexp_correct_oop : ah:AncHeap -> exp:BExp -> st:state ->
  Lemma (requires (zeroHeap st ah / \ disjoint (elts ah) (vars exp)))
  (ensures (compileBExpEval_oop ah exp st = evalBExp exp st))
    (decreases % [exp;1])
let rec compile_bexp_correct ah targ exp st = match exp with
  | BFalse -> ( )
  | BVar x -> ( )
  | BNot x ->
      let (ah', xres, xanc, xgate) = compileBExp ah targ x in
      let ind_hyp_x = compile_bexp_correct ah targ x st in
        evalCirc_append xgate [RNOT xres] st
  | BXor (x, y) ->
      let (ah', xres, xanc, xgate) = compileBExp ah targ x in
      let (ah'', yres, yanc, ygate) = compileBExp ah' targ y in
      let st' = evalCirc xgate st in
      let ind_hyp_x = compile_bexp_correct ah targ x st in
      let ind_hyp_y =
        compile_decreases_heap ah tarq x;
        disjoint_subset (elts ah') (elts ah) (vars y);
        complie_partition ah targ x;
        zeroHeap_subset st ah ah';
        zeroHeap_st_impl st ah' xgate;
        compile_bexp_correct ah' targ y st'
      in
      let lem1 (* (eval (xgate@ygate)) targ = (eval ygate st') targ *)
        evalCirc_append xgate ygate st
      in
      let lem2 = (* eval y st = eval y st' *)
        complie_mods ah targ x;
        eval_mod st xgate;
        eval_state_swap y st st'
      in
        ( )
  | BAnd (x, y) ->
      let (ah', xres, xanc, xgate) = compileBExp_oop ah x in
      let (ah'', yres, yanc, ygate) = compileBExp_oop ah' y in
      let st' = evalCirc xgate st in
      let ind_hyp_x = compile_bexp_correct_oop ah x st in
      let ind_hyp_y =
        compile_decreases_heap_oop ah x;
        disjoint_subset (elts ah') (elts ah) (vars y);
        compile_parrtition_oop ah x;
        zeroHeap_subset st ah ah';
        zeroHeap_st_impl st ah' xgate;
        compile_bexp_correct_oop ah' y st'
      in
```

```
        let lem1 = (* st' xres = (evalCirc ygate st') xres *)
          compile_mods_oop ah' y;
          eval_mod st' ygate
        in
        let lem2 = (* eval y st = eval y st' *)
          compile_mods_oop ah x;
          eval_mod st xgate;
          eval_state_swap y st st'
        in
        let lem3 = ( ) (* st targ = (evalCirc ygate st') targ *)
        in
          evalCirc_append xgate ygate st;
          evalCirc_append (xgate@ygate) [RTOFT (xres, yres, targ)] st
  and compile_bexp_correct_oop ah exp st = match exp with
    | BVar v -> ( )
    | _ ->
        let (ah', targ) = popMin ah in
        let (ah'', _, _, gates) = compileBExp ah' targ exp in
          pop_proper_subset ah;
          pop_elt ah;
          compile_bexp_correct ah' targ exp st
(* Lemma 1 *)
val evalCirc_state_lem : circ:list Gate -> st:state -> st':state -> dom:set int ->
    Lemma (requires (subset (ctrls circ) dom /\ agree_on st st' dom))
          (ensures (agree_on (evalCirc circ st) (evalCirc circ st') dom))
let rec evalCirc_state_lem circ st st' dom = match circ with
    | [ ] -> ( )
    | x::xs ->
      applyGate_state_lem x st st' dom;
      evalCirc_state_lem xs (applyGate st x) (applyGate st' x) dom
val uncompute_agree : circ:list Gate -> dom:set int -> st:state ->
    Lemma (requires (wfCirc circ /\ disjoint (ctrls circ) dom))
          (ensures (agree_on (evalCirc circ st)
                             (evalCirc (uncompute circ dam) st)
                             (complement dom)))
let rec uncompute_agree cir dom st = match circ with
    | [ ] -> ( )
    | x::xs ->
      if (contains_1st dom (vars [x]))
      then
        (evalCirc_state_lem xs (applyGate st x) st (complement dom);
         uncompute_agree xs targ st;
         agree_on_trans (evalCirc xs (applyGate st x))
                        (evalCirc xs st)
                        (evalCirc (uncompute xs dom) st)
                        (complement dom))
      else uncompute_agree xs dom (applyGate st x)
(* Theorem 2 *)
val uncompute_correct : circ:list Gate -> dom:set int -> st:state ->
    Lemma (requires (wfCirc circ /\ disjoint (ctrls circ) dom))
          (ensures (agree_on st (evalCirc (List.rev (uncompute circ dom))
                                          (evalCirc circ st))
                                (complement dom)))
let uncompute_correct circ dom st =
    uncompute_agree circ dom st;
    uncompute_ctrls_subset circ dom;
    evalCirc_state_le (List.rev (uncompute circ dom))
                      (evalCirc circ st)
                      (evalCirc (uncompute circ dom) st)
                      (complement dom);
    rev_inverse (uncompute circ dom) st
(* Corollary 1 *)
val compile_with_cleanup : ah:AncHeap -> targ:int -> exp:BExp -> st:state ->
    Lemma (requires (zeroHeap st ah /\ disjoint (elts ah) (vaxs exp) /\
                     not (Util.mem targ (elts ah)) /\
                     not (Util,mem targ (vars exp))))
          (ensures (clean_heap_cond ah targ exp st /\
                    clean_corr_cond ah targ exp st))
let compile_with_cleanup ah targ exp st =
    let (ah', res, anc, circ) = compileBExp ah targ exp in
    let cleanup = uncompute circ (singleton res) in
    let ab'' = List.fold_leftT insert ah' anc in
    let st' = evalCirc circ st in
    let st'' = evalCirc (circ@(List.rev cleanup)) st in
    let heap_cond =
      let lem1 = (* zeroHeap st' ah' *)
        compile_decreases_heap ah targ exp;
        compile_partition ah targ exp;
```

-continued

```
        zeroHeap_subset st ah ah';
        zeroHeap_st_impl st ah' circ
      in
      let lem1 = (* zeroHeap st" ah' *)
        compileBExp_wf ah targ exp;
        uncompute_uses_subset circ (singleton res);
        zeroHeap_st_impl st' ah' (List.rev cleanup)
      in
        compile_ctrls ah targ exp;
        uncompute_correct circ (singleton res) st;
        compile_anc ah targ exp;
        zeroHeap_insert_list st" ah' anc
    in
    let corr_cond =
      uncompute_targ circ res;
      eval_mod st' (List.rev cleanup)
    in
      ( )
val compile_with_cleanup_oop : ah:AncHeap -> exp:BExp -> st:state ->
    Lemma (requires (zeroHeap st ah /\ disjoint (elts ah) (vars exp)))
        (ensures (zeroHeap (compileBExpCleanEvalSt_oop ah exp st)
                    (first (compileBExpClean_oop ah exp)) / \
                compileBExpCleanEval_oop ah exp st =
                    compileBExpEval_oop ah exp st))
let compile_with_cleanup_oop ah exp st =
    let (ah', targ) = popMin ah in
        compile_with_cleanup ah' targ exp st
(* Optimization theorems *)
val simplify_preserves_semantics : exp:BExp ->
    Lemma (forall (st:state). (evalBExp exp st) = (evalBExp (simplify exp) st))
let rec simplify_preserves_semantics exp = match exp with
    | BFalse -> ( )
    | BVar x -> ( )
    | BAnd (x, y) | BXor (x, y) ->
        simplify_preserves_semantics x;
        simplify_preserves_semantics y
    | BNot x -> simplify_preserves_semantics x
val factorAs_correct : exp:BExp -> targ:int -> st:state ->
    Lemma (forall exp' . factorAs exp targ = Some exp'==>
            not (occursTnBExp targ exp') /\ evalBExp exp st = st targ <> evalBExp exp' st)
let rec factorAs_correct exp targ st = match exp with
    | BFalse -> ( )
    | BVar x -> ( )
    | BNot x -> factorAs_correct x targ st
    | BAnd (x, y) -> ( )
    | BXor (x, y) ->
        factorAs_correct x targ st;
        factorAs_correct y targ st
val dist_preserves_semantics : exp:BExp ->
    Lemma (forall (st:state). (evalBExp exp st) = (evalBExp (distributeAnds exp) st))
let rec dist_preserves_semantics exp = match exp with
    | BFalse -> ( )
    | BVar x -> ( )
    | BNot x -> dist_preserves_semantics x
    | BXor (x, y) -> dist_preserves_semantics x; dist_preserves_semantics y
    | BAnd (x, y) ->
        dist_preserves_semantics x;
        dist_preserves_semantics y;
        begin match (distributeAnds x, distributeAnds y) with.
            | (BXor (a, b), BXor (c, d)) ->
                distributivityAndXor (BXor (a, b)) c d;
                commutativityAnd (BXor (a, b)) c;
                commutativityAnd (BXor (a, b)) d;
                distributivityAndXor c a b;
                distributivityAndXor d a b;
                commutativityAnd c a;
                commutativityAnd c b;
                commutativityAnd d a;
                commutatvityAnd d b
            | (x', BXor (c, d)) -> distributivityAndXor x' c d
            | (BXor (a, b), y') ->
                commutativityAnd (BXor (a, b)) y';
                distributivityAndXor y' a b;
                commutativityAnd y' a b
                commutativityAnd y' b
            | (x', y') -> ( )
        end
```

```
(* Theorem 4 and related lemma *)
type state_equiv (st:boolState) (st':BExpState) (init:state) =
    forall i. boolEval st init i = bexpEval st' init i
val eval_bexp_swap : st:boolState -> st':BExpState -> bexp:BEx -> init:state ->
    Lemma (requires (state_equiv st st' init))
          (ensures (evalBExp (substBExp bexp (snd st')) init =
                    eval.BExp bexp (snd st)))
let rec eval_bexp_swap st st' bexp init = match bexp with
  | BFalse -> ( )
  | BVar i -> ( )
  | BNot x -> eval_bexp_swap st st' x init
  | BXor (x, y) | BAnd (x, y) ->
      eval_bexp_swap st st' x init;
      eval_bexp_swap st st' y init
val state_equiv_assign : st:boolState -> st':BExpState -> init:state -> l:int -> : bexp:BExp ->
    Lemma (requires (state_equiv st st' init))
          (ensures (state_equiv (boolAssign st 1 bexp) (bexpAssign st' 1 bexp) init))
let state_equiv_assign st st' init 1 bexp = eval_bexp_swap st st' bexp init
(* Theorem 5 and related lemmas *)
type circ_equiv (st:boolState) (cs:circState) (init:state) =
    zeroHeap (evalCirc cs.gates init) cs.ah /\
    (forall i. not (mem (lookup cs.subs i) cs.ah)) /\
    (forall i. boolEval st init i = circEval cs init i)
val eval_commutes_subst_circ : st:boolState -> cs:circ.State -> bexp:BExp ->
    bexp':BExp -> init:state -> targ:int -> targ':int ->
    Lemma (requires (circ_equiv st cs init / \,
                     bexp' = substVar bexp cs.subs / \
                     targ' = lookup cs.subs targ / \
                     not (Util.mem targ' (vars bexp')) / \
                     not (Util.mem targ' (elts cs.h)) / \
                     disjoint (elts cs.ah) (vars bexp')))
          (ensures ((evalCirc (last (compileBExp cs.ah targ' bexp'))
                              (evalCirc cs.gates init)) targ' =
                    lookup (snd st) targ <> evalBExp bexp (snd st)))
let eval_commutes_subst_circ st cs bexp bexp' init targ targ' =
    let init' = evalCirc cs.gates init in
        compile_bexp_correct cs.ah targ' bexp' init';
        eval_bexp_swap st cs bexp bexp', init
val eval_commutes_subst_circ_oop : st:boolState -> cs:circState ->
    bexp:BExp -> bexp':BExp -> init:state ->
    Lemma (requires (circ_equiv st cs init / \
                     bexp' = substVar bexp cs.subs / \
                     disjoint (elts cs.ah) (vars bexp')))
          (ensures ((evalCirc (last (compileBExp_oop cs.ah bexp'))
                              (evalCirc cs.gates init))
                    (second (compileBExp_oop cs.ah bexp')) =
                    evalBExp bexp (snd st)))
let eval_commutes_subst_circ_oop st cs bexp bexp' init =
    let init' = evalCirc cs.gates init in
        compile_bexp_correct_oop cs.ah bexp' init';
        eval_bexp_swap st cs bexp bexp' init
val circ_equiv_assign : st:boolState -> cs:circState -> init:state -> l:int -> dexp:BExp ->
    Lemma (requires (circ_equiv st cs init))
          (ensures (circ_equiv (boolAssign st 1 bexp) (circAssign cs 1 bexp) init))
let circ_equiv_assign st cs init 1 bexp =
    let 1' = lookup cs.subs 1 in
    let bexp' = substVar bexp cs.subs in
    let init' = evalCirc cs.gates init in
    let st' = boolAssign st 1 bexp in
    let cs' = circAssign cs 1 bexp in
    match factorAs bexp' 1' with
      | None ->
        let (ah', res, ancs, circ') = compileBExp_oop cs.ah bexp' in
        let zeroHeap_lem =
          compile_decreases_heap_oop cs.ah bexp';
          compile_partition_oop cs.ah bexp';
          zeroHeap_subset init' cs.ah cs'.ah;
          zeroHeap_st_impl init' cs'.ah circ'
        in
        let preservation =
          compile_mods_oop cs.ah bexp';
          eval_mod init' circ'
        in
        let correctness =
          eval_commutes_subst_circ_oop st cs bexp bexp' init
        in
        ( )
      | Some bexp" ->
        let (ah', res, ancs, circ') = compileBExp cs.ah 1' bexp" in
```

```
        let zeroHeap_lem =
            factorAs_correct bexp' 1' init';
            factorAs_vars bexp'1';
            compile_,decreases_heap cs.ah 1' bexp";
            compile_partition cs.ah 1' bexp";
            zeroHeap_subset init' cs.ah cs'.ah;
            zeroHeap_st_impl init' cs'.ah circ'
        in
        let preservation =
            complie_mods cs.ah 1' bexp";
    eval_mod init' circ'
in
let correctness =
    admitP(b2t(lookup (snd st') 1 = (evalCirc circ' init') (lookup cs' subs 1)));
    factorAs_correct bexp' 1' init';
    eval_commutes_subst_circ st cs bexp bexp' init 1 1'
in
( )
```

12. Concluding Remarks

Having described and illustrated the principles of the disclosed technology with reference to the illustrated embodiments, it will be recognized that the illustrated embodiments can be modified in arrangement and detail without departing from such principles. For instance, elements of the illustrated embodiments shown in software may be implemented in hardware and vice-versa. Also, the technologies from any example can be combined with the technologies described in any one or more of the other examples. It will be appreciated that procedures and functions such as those described with reference to the illustrated examples can be implemented in a single hardware or software module, or separate modules can be provided. The particular arrangements above are provided for convenient illustration, and other arrangements can be used.

What is claimed is:

1. A computer-implemented method, comprising:
   by a verification tool adapted to perform formal verification of a reversible circuit compiler and implemented by one or more computing devices:
      verifying operation of the reversible circuit compiler, the reversible circuit compiler being configured to generate a reversible circuit from a high-level program description of the reversible circuit, the reversible circuit being a reversible circuit description including a reversible gate set implementable by a quantum computing device,
      wherein the verifying includes verifying that an intermediate representation of the reversible circuit that is generated by the reversible circuit compiler satisfies one or more verification criteria relative to a higher-level intermediate representation of the reversible circuit that is also generated by the reversible circuit compiler;
      generating the reversible gate set from the high level program; and
      implementing the reversible gate set in a target reversible circuit architecture.

2. The computer-implemented method of claim 1, wherein the one or more criteria include one or more of: (a) ensuring that the intermediate representation of the reversible circuit implements the same function as the higher-level intermediate representation; or (b) ensuring that all ancilla bits that are allocated by the intermediate representation of the reversible circuit are returned clean.

3. The computer-implemented method of claim 1, wherein the verifying further includes type-checking the intermediate representation relative to the higher-level intermediate representation, ensuring application of functions to inputs of appropriate types, allowing only operations or transformations that do not violate the rules of a type system, wherein in the type system is specified by a set of type inference rules.

4. The computer-implemented method of claim 1, wherein the verifying comprises performing one or more semantic checks of the intermediate representation relative to the higher-level intermediate representation.

5. The computer-implemented method of claim 4, wherein the semantic checks are performed by a proof system that asserts the correctness of one or more transformations of the compiler as the compiler generates the reversible circuit from the high-level program.

6. The computer-implemented method of claim 1, wherein the high-level program is an algorithmic description of the reversible circuit describing the behavior of the reversible circuit.

7. A system, comprising:
   a processor; and
   at least one memory coupled to the processor and having stored thereon processor-executable instructions for implementing a verification process for a reversible circuit compiler, the reversible circuit compiler being configured to generate a reversible circuit from a high-level behavioral description of the reversible circuit, the reversible circuit including a reversible gate set implementable in a target quantum circuit architecture, the compiler verification process comprising verifying that all ancilla bits that are allocated during reversible circuit compilation are returned to a clean state by the reversible gate set produced by the reversible circuit compiler; and
   a reversible circuit controller coupled to the target reversible circuit architecture, the reversible circuit controller configured to implement the reversible circuit description in the target reversible circuit architecture.

8. The system of claim 7, wherein the verification process further comprises verifying that the reversible gate set produced by the reversible circuit compiler performs the same function as the high-level behavioral description.

9. A reversible circuit compilation system, comprising:
   a memory;
   a reversible circuit compiler, the reversible circuit compiler being configured to:

input, into the memory, a program describing a desired computation to be performed in a target reversible circuit architecture using bits, transform the program into a reversible circuit description specifying one or more reversible gates that use the bits to achieve the desired computation, and store, in the memory, the reversible circuit description, apply one or more ancilla-reducing techniques to reduce the number of ancillas used by the reversible circuit description as part of the transformation of the program into the reversible circuit description; and generate a reversible circuit from the reversible circuit description, the reversible circuit including a reversible gate set implementable in the target quantum circuit architecture; and a reversible circuit controller coupled to the target reversible circuit architecture, the reversible circuit controller configured to implement the reversible circuit description in the target reversible circuit architecture.

10. The reversible circuit compilation system of claim 9, wherein one of the ancilla-reducing techniques applied comprises:

identifying an operation in the program that can be implemented as an exclusive-or operation of a target bit; and generating a reversible circuit with a reversible ancilla bit to implement the operation.

11. The reversible circuit compilation system of claim 9, wherein one of the ancilla-reducing techniques comprises rewriting AND operations from the program into a positive-polarity exclusive-sum-of-products form.

12. The reversible circuit compilation system of claim 9, wherein one of the ancilla-reducing techniques comprises simplifying one or more of an XOR or AND expression, the simplification being performed by factoring the XOR or AND expression to reduce depth.

13. The reversible circuit compilation system of claim 9, wherein the reversible circuit is further configured to, as part of the transformation of the program into the reversible circuit description, reduce sub-expressions in the program to Boolean expressions and apply the ancilla-reducing techniques to the Boolean expressions.

* * * * *